(12) United States Patent
Kindaichi et al.

(10) Patent No.: US 9,910,243 B2
(45) Date of Patent: Mar. 6, 2018

(54) LENS INTERCHANGEABLE TYPE CAMERA, INTERCHANGEABLE LENS, AND CONTROL METHOD FOR LENS

(71) Applicant: Olympus Corporation, Hachioji-shi, Tokyo (JP)

(72) Inventors: Takeshi Kindaichi, Hachioji (JP); Yasutaka Sawa, Fuchu (JP); Tomoaki Hatori, Hachioji (JP)

(73) Assignee: Olympus Corporation, Tokyo (JP)

( * ) Notice: Subject to any disclaimer, the term of this patent is extended or adjusted under 35 U.S.C. 154(b) by 46 days.

(21) Appl. No.: 15/094,725

(22) Filed: Apr. 8, 2016

(65) Prior Publication Data

US 2016/0320588 A1     Nov. 3, 2016

(30) Foreign Application Priority Data

Apr. 28, 2015   (JP) ................................ 2015-091739

(51) Int. Cl.
| | |
|---|---|
| *H04N 5/232* | (2006.01) |
| *G02B 7/16* | (2006.01) |
| *G02B 7/09* | (2006.01) |
| *H04N 5/225* | (2006.01) |
| *H04N 5/235* | (2006.01) |

(52) U.S. Cl.
CPC ............... *G02B 7/16* (2013.01); *G02B 7/09* (2013.01); *H04N 5/2256* (2013.01); *H04N 5/2353* (2013.01); *H04N 5/23209* (2013.01); *H04N 5/23212* (2013.01); *H04N 5/23245* (2013.01); *H04N 5/23293* (2013.01)

(58) Field of Classification Search
CPC ....................................................... G02B 7/16
USPC ....................................................... 348/345
See application file for complete search history.

(56) References Cited

U.S. PATENT DOCUMENTS

| | | | | |
|---|---|---|---|---|
| 4,985,723 A | * | 1/1991 | Egawa | ..................... G02B 7/28 396/133 |
| 8,301,023 B2 | | 10/2012 | Saito et al. | |
| 2005/0022621 A1 | * | 2/2005 | Kusano | ................... F16H 59/02 74/335 |

* cited by examiner

*Primary Examiner* — Joel Fosselman
(74) *Attorney, Agent, or Firm* — John C. Pokotylo; Pokotylo Patent Services

(57) ABSTRACT

A lens interchangeable type camera system, comprising an interchangeable lens and a camera body, comprising a first control section that carries out manual focus control by detecting rotation direction and rotation amount of an operation member, in accordance with a manual focus mode command from a mode setting at a time when the operation member is at the first position, and a second control section that, when the operation member is at a second position, irrespective of a command from a mode setting section, notifies a detection result of a first detection section to the camera body, detects rotational position of the operation member using a third detection section, and forcibly carries out manual focus control based on a rotation position, wherein the lens interchangeable type camera system further comprises a function restriction section that sets operation of the second control section to valid or invalid.

9 Claims, 16 Drawing Sheets

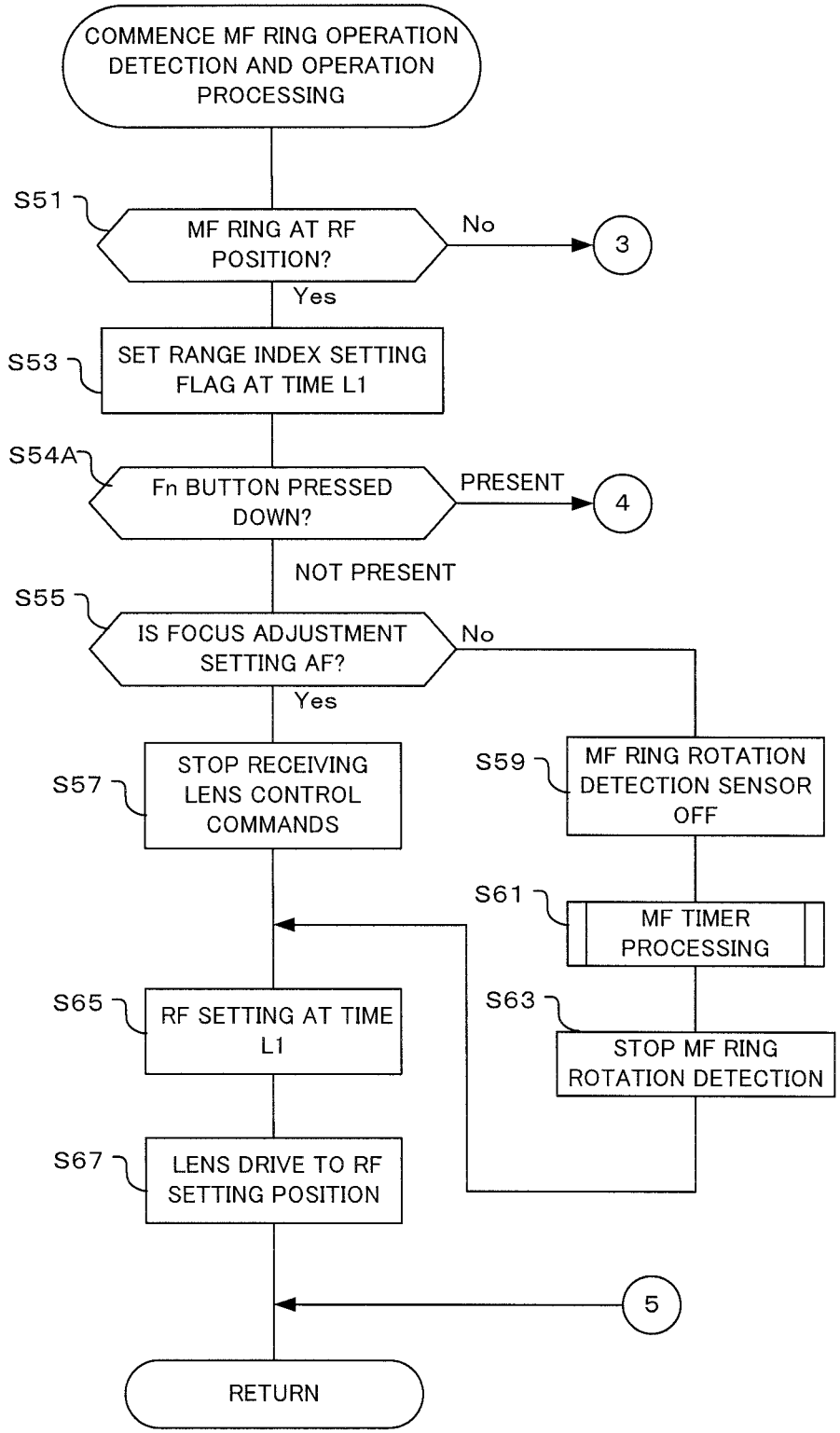

LENS INTERCHANGEABLE TYPE CAMERA, INTERCHANGEABLE LENS, AND CONTROL METHOD FOR LENS

Benefit is claimed, under 35 U.S.C. § 119, to the filing date of prior Japanese Patent Application No. 2015-091739 filed on Apr. 28, 2015. This application is expressly incorporated herein by reference. The scope of the present invention is not limited to any requirements of the specific embodiments described in the application.

BACKGROUND OF THE INVENTION

1. Field of the Invention

The present invention relates to a lens interchangeable type camera system, an interchangeable lens, and a lens control method, having an operation member that is capable of sliding in an optical axis direction provided on the interchangeable lens, for controlling focus position in accordance with the position that has been set by rotation of the operation member when the operation member is at a second position.

2. Description of the Related Art

A lens unit has been proposed that has a focus ring that slides in an optical axis direction and rotates around the optical axis provided on a lens barrel, and that is capable of a relative position indication type focus operation if this focus ring is at a first position, while being capable of an absolute position indication type focus operation if the focus ring is slid to a second position (referred to Japanese patent laid open number 2011-133820 (hereafter referred to as patent publication 1)).

As has been described above, in an imaging device, if it is made possible to switch between two types of focus operation by sliding a focus ring, it is possible to carry out optimum manual focus in accordance with shooting conditions, which is extremely convenient. However, when an imaging device is carried in a bag or the like there may be cases where the focus ring slides unintentionally. There may be situations where even if the user thinks they have set the focus ring to a first position it is actually set at a second position. In such a case a focus operation will be an erroneous operation.

SUMMARY OF THE INVENTION

An object of the present invention is to provide a lens interchangeable type camera system, an interchangeable lens, and a lens control method, with which an operation member can slide to a first position and a second position, and there is no erroneous operation in a situation where lens control is carried out in accordance with the first position and the second position.

A lens interchangeable type camera system of a first aspect of the present invention, having an interchangeable lens and a camera body to which the interchangeable lens can be fitted, comprises a mode setting section that switches between auto focus and manual focus, the interchangeable lens comprising an annular operation member, arranged outside the interchangeable lens, that is capable of sliding to a first position on the second position in the optical axis direction, a first detection section that detects position of the operation member, a second detection section that detects rotation direction and rotation amount of the operation member at a time when the operation member is at the first position as a result of a slide operation, and a third detection section that detects rotation position of the operation member at a time when the operation member is at the second position as a result of a slide operation, a first control section that, when the operation member is at the first position, carries out manual focus control by detecting rotation direction and rotation amount of the operation member using the second detection section, in accordance with a manual focus mode command from the mode setting section, a second control section that, when the operation member is at the second position, irrespective of a command from the mode setting section, notifies a detection result of the first detection section to the camera body, detects rotational position of the operation member using the third detection section, and forcibly carries out manual focus control based on the rotation position, wherein the lens interchangeable type camera system further comprises a function restriction section that sets operation of the second control section to valid or invalid.

An interchangeable lens of a second aspect of the present invention, that can be fitted to a camera body having a mode setting section that switches between autofocus and manual focus, comprises an annular operation member, on the exterior of the interchangeable lens, that is capable of sliding to a first position or a second position in the optical axis direction, a first detection section that detects position of the operation member, a second detection section that detects rotation direction and rotation amount of the operation member at a time when the operation member is at the first position as a result of a slide operation, a third detection section that detects rotation position of the operation member at a time when the operation member is at the second position as a result of a slide operation, a first control section that carries out manual focus control by detecting rotation direction and rotation amount of the operation member using the second detection section, in accordance with a manual focus mode command from the mode setting section at a time when the operation member is at the first position, a second control section that, when the operation member is at the second position, irrespective of a command from the mode setting section, notifies a detection result of the first detection section to the camera body, detects rotational position of the operation member using the third detection section, and forcibly carries out manual focus control based on the rotation position, and a function restriction section that sets operation of the second control section to valid or invalid.

A lens control method of a third aspect of the present invention, for an interchangeable lens that can be attached to a camera body, the camera body being able to switch between autofocus and manual focus, and the interchangeable lens comprising an annular operation member, arranged on the exterior of the interchangeable lens, that is capable of sliding to a first position or a second position in the optical axis direction, a first detection section that detects position of the operation member, a second detection section that detects rotation direction and rotation amount of the operation member at a time when the operation member is at the first position as a result of a slide operation, a third detection section that detects rotation position of the operation member at a time when the operation member is at the second position as a result of a slide operation, the lens control method for an interchangeable lens comprising, when the operation member is at the first position, carrying out first control to carry out manual focus control by detecting rotation direction and rotation amount of the operation member using the second detection section, in accordance with a mode command for the manual focus, when the operation member is at the second position, irrespective of a command from the mode setting section, notifying a detection result of the first detection section to the camera body, detecting rotational position of the operation member using the third detection section, and carrying out second control to forcibly carry out manual focus control based on the rotation position, and setting operation of the second control to valid or invalid.

BRIEF DESCRIPTION OF THE DRAWINGS

FIG. 13 is a flowchart showing MF ring operation detection and operation processing in the modified example of operation of the camera body and the interchangeable lens of the second embodiment of the present invention.

DETAILED DESCRIPTION OF THE PREFERRED EMBODIMENTS

Figure 1:
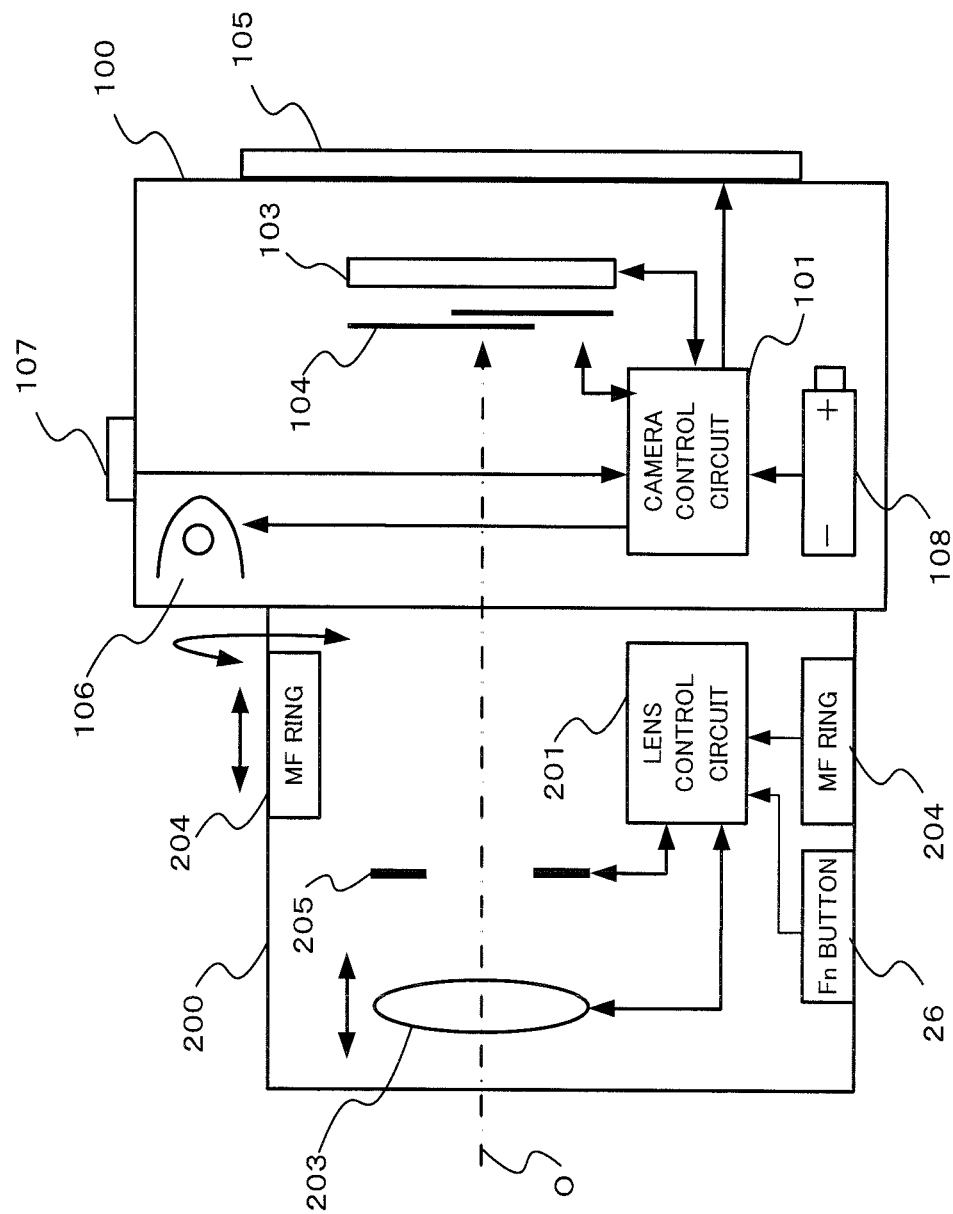
FIG. 1 is a block diagram showing the internal structure of a camera relating to a first embodiment of the present invention.

Preferred embodiments using a camera system, constituted by a camera body and an interchangeable lens, to which the present invention has been applied will be described in the following in accordance with the drawings. FIG. 1 is a block diagram showing the structure of a camera system of one embodiment of the present invention, and this camera system comprises a camera body 100 and an interchangeable lens 200. The interchangeable lens 200 is removably attached to the camera body 110 by means of a bayonet mount.

A camera control circuit 101, image sensor 103, focal plane shutter 104, display monitor 105, strobe unit 106, release button 107 and battery 108 etc. are arranged inside the camera body 100. Also, a lens control circuit 201, focus adjustment lens 203, MF ring 204 and aperture 205 etc. are arranged inside the interchangeable lens 200.

The camera control circuit 101 is made up of an ASIC (application-specific integrated circuit) including a body CPU (central processing unit) 121 (refer to FIG. 2B) etc., and peripheral circuits of the ASIC. If a photographer operates the release button 107, the image sensor 103 and focal plane shutter 104 etc. are controlled, and firing control of the strobe unit 106 is carried out as required, and shooting operations etc. are executed by means of the lens control circuit 201.

The camera control circuit 101 collectively controls various sequences for the entire camera system in collaboration with a lens CPU 221 (refer to FIG. 2A) within the lens control circuit 201, which will described later. This control is executed in accordance with programs that have been stored in a flash ROM 122 (refer to FIG. 2B). Details of this camera control circuit 101 will be described later using FIG. 2B.

The image sensor 103 is constructed using a solid-state image sensor such as a CCD (Charge Coupled Device) image sensor or a CMOS (Complementary Metal Oxide Semiconductor) image sensor, and converts a subject image that has been formed by the interchangeable lens 200 into image signals. Specifically, in accordance with signals from the camera control circuit 101, the image sensor 103 carries out an electrical charge accumulation operation, generates an image signal, and reads out the image signal etc. In this specification, signals based on output from the image sensor 103 may be referred to as image data as well as image signals.

The focal plane shutter 104 performs opening and closing operations in response to an instruction from a shutter control circuit 126 (refer to FIG. 2B) within the camera control circuit 101, based on the release button 107 being pressed down fully, and opens and closes subject light flux from the interchangeable lens 200. The opening and closing time is a time corresponding to a shutter speed that has been calculated by the camera control circuit 101.

The display monitor 105 is constituted by an LCD or organic EL etc. arranged on the rear surface or the like of the camera body. The display monitor 105 carries out live view display at the time of still picture shooting, standby and movie shooting, playback display of taken images that have already been stored in accordance with the operation of a playback button etc., and display of setting information on menu screens or the like in response to operation of a menu button etc.

The strobe unit 106 irradiates supplementary light to a subject in accordance with a command from a strobe control circuit 125 (refer to FIG. 2) within the camera control circuit 101, in a case where the surrounding area is dark at the time of operation of the release button 107. This light emission is carried out in synchronization with opening and closing operations of the focal plane shutter 104, using charge that has been stored in an emission capacitor (not shown).

The release button 107 is made up of a first release switch 132 (refer to FIG. 2B) that turns on when the button is pressed down half way, and a second release switch 133 (refer to FIG. 2B) that is turned on when the button is pressed down further from the half-pressed state to be pressed down fully. The camera control circuit 101 executes shooting preparation sequences, such as AE (auto exposure) operation and AF (autofocus) operation if the first release switch 132 is turned on. Also, if the second release switch 133 is turned on the camera control circuit 101 carries out shooting by executing a series of shooting sequences to control the focal plane shutter 104 etc., acquire image data based on a subject image from the image sensor 103 etc., and store this image data in a storage medium.

The battery 108 supplies power to respective members and respective circuits within the camera body 100 and the interchangeable lens 200.

The lens control circuit 201 within the interchangeable lens 200 has an ASIC (Application Specific Integrated Circuit) including the lens CPU etc., and peripheral circuits of the ASIC. In response to a command from the camera control circuit 101, or the user operating the MF ring 204, drive control for the focus adjustment lens 203 and the aperture 205 is carried out by the lens control circuit 201. Also, the lens control circuit 201 carries out control etc. in accordance with operation of a function button (Fn button). Various lens information, such as focal length, set length, and aperture value, is sent in response to a request from the camera control circuit 101. This control is executed in accordance with programs that have been stored in a flash ROM (not shown). Details of this lens control circuit 201 will be described later using FIG. 2A.

The focus adjustment lens 203 moves in the optical axis direction based on instruction from the lens control circuit 201, and adjusts the focused state of the interchangeable lens 200. In this embodiment, the lens is described as a fixed focal length lens, but it may also be constituted by a zoom lens for which focal length can be varied.

The MF ring 204 is arranged on the outer periphery of the interchangeable lens 200, being capable of a rotation operation around the optical axis of the interchangeable lens 200 and also capable of a slide operation along the optical axis direction between a first position and a second position. By carrying out a rotation operation at a first position where the MF ring 204 has been slid toward the front of the interchangeable lens 200 (toward the subject), a manual focus operation is possible. Also, by performing a rotation operation at the second position where the MF ring 204 has been slid to the rear of the interchangeable lens 200 (toward the photographer), a range focus operation is possible. An MF ring 204 is arranged on the exterior of the interchangeable lens, and functions as an annular operation member that is capable of sliding to a first position and a second position in the optical axis direction. The first position and the second position of the MF ring 204 will be described later using FIG. 3 and FIG. 4.

Opening area of the aperture 205 is varied based on a command from the lens control circuit 201. Specifically, the aperture 205 adjusts amount of light of subject light flux that passes through the interchangeable lens 200.

Figure 2A:
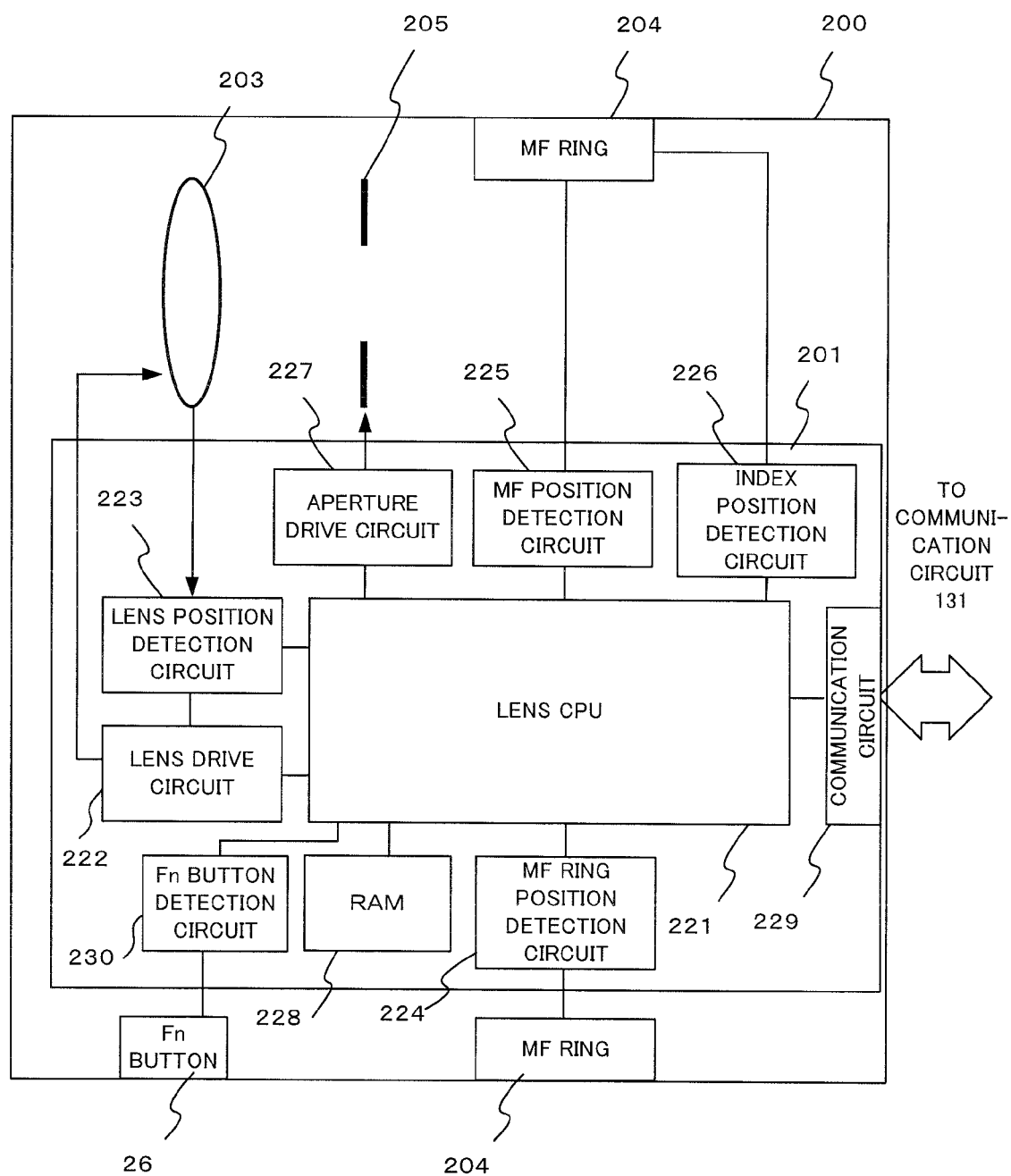
FIG. 2A and FIG. 2B are block diagrams mainly showing the electrical structure of a camera of the first embodiment of the present invention.
Figure 2B:
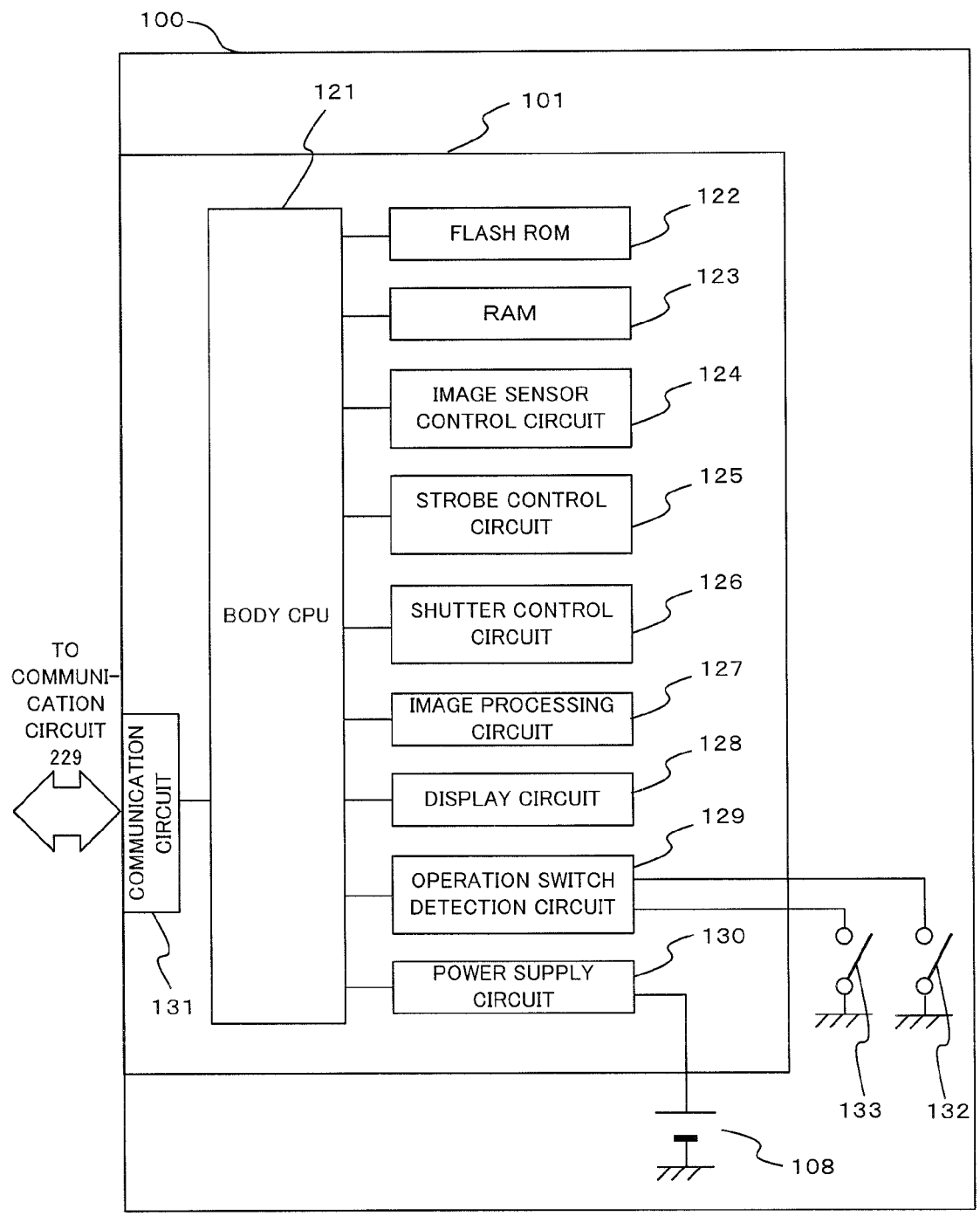

Next, details of the camera control circuit 101 and lens control circuit 201 will be described using FIG. 2A and FIG. 2B. A body CPU 121 is provided within the camera control circuit 101, and a flash ROM (read only memory) 122, RAM (random access memory) 123, image sensor control circuit 124, strobe control circuit 125, shutter control circuit 126, image processing circuit 127, display circuit 128, operation switch detection circuit 129, a power supply circuit 130, and communication circuit 131 are connected to this body CPU 121. Input and output of various signals is carried out between these various circuits and the body CPU 121.

The body CPU 121 collectively controls the entire camera in accordance with programs etc. that are stored in the flash ROM 122. Also, the body CPU 121 is capable of communication with the lens CPU 221 by means of a camera body communication circuit 131 and a lens communication circuit 229, with control instructions being output and lens information such as lens position of the focus adjustment lens 203 being acquired.

Also, the body CPU 121 carries out setting for autofocus mode and manual focus mode on menu screens, that will be described later. The body CPU 121 functions as a mode setting section for switching between autofocus and manual focus.

The flash ROM 122 is an electrically rewritable non-volatile memory, and stores programs to be executed by the body CPU 121, as was described previously, and also stores various adjustment values etc. Memory other than flash ROM may also be adopted as long as it is non-volatile memory. The RAM 123 is an electrically rewritable volatile memory, such as DRAM (dynamic random access memory) or SDRAM (synchronous DRAM), and temporarily stores various information for processing in the body CPU 121.

The image sensor control circuit 124 executes imaging operations at the image sensor 103 in order to convert a subject image into image signals, at the time of executing processing operations that require image data, such as live view display, AE, AF, exposure at the time of shooting etc. As imaging operations, charge storage control and image signal readout etc. are carried out for the image sensor 103.

The strobe control circuit 125 is connected to the strobe unit 106, and carries out charging control and emission control of the strobe unit 106. The strobe control circuit 125 carries out emission amount control so as to achieve optimum exposure based on lens position information of the focus adjustment lens 203 that has been acquired from the lens CPU 221, for example. The shutter control circuit 126 is connected to the focal plane shutter 104, and carries out opening and closing control of the focal plane shutter 104 based on a shutter speed signal from the body CPU 121.

The image processing circuit 127 applies image processing such as A/D conversion and filter processing on image signals that have been output from the image sensor 103. Also, in applying image processing, the image processing circuit 127 carries out image processing for live view display, and performs live view display on the display monitor 105 based on the processed image signals. Image processing of a taken image for storage is also carried out by the image processing circuit 127, and this processed image data is stored in a storage medium (not shown).

Also, the image processing circuit 127 carries out extraction processing by subjecting high-frequency components from image signals within a focus detection region to high pass filter processing, and calculates an AF evaluation value. In this embodiment, well-known contrast AF has been adopted in the focus detection, where the focus adjustment lens 203 is moved and a position at which the AF evaluation value becomes a peak is made a focus position. The focus detection method is not limited to contrast AF, and another method such as phase difference AF may also be adopted.

The display circuit 128 is connected to the display monitor 105, and carries out live view display, playback display of taken images that have been stored in a storage medium, and display of various shooting information such as menu screens.

The operation switch detection circuit 129 is connected to the first release switch 132 linked to the release button 107, and to the second release switch 133 and other detection switches (not shown), and detects operating states of the switches, outputting detection results to the body CPU 121. The other detection switches are a power supply switch that is linked to a power supply button for turning a power supply on and off, a shooting mode switch for switching shooting modes of the camera, a menu switch that is linked to a menu button for displaying menu screens, a playback switch that is linked to a playback button for causing execution of playback display of taken images stored in the storage medium, a mount switch for detecting an attachment state of the interchangeable lens 200, and a movie switch that is linked to a movie button for instructing start and stop of movie shooting, etc.

Setting of various shooting information, such as focusing mode, is carried out through the above-described menu screens. In this embodiment there are two focusing modes set in the menu screens, namely auto focus mode (AF mode) where focusing of the focus adjustment lens 203 is carried out automatically, and manual focus mode (MF mode) where focusing is carried out manually. It should be noted that with this embodiment, setting of focus adjustment mode in the camera body 100 is carried out on a menu screen, but the focus adjustment mode may be set by another method such as setting using a dedicated button.

It is also possible to carry out setting to invalidate RF mode (range focus mode), which will be described later, on a menu screen. RF mode is set if the MF ring 204 is slid to the second position, but there may be situations where the MF ring 204 has been slid to the second position against the intentions of the photographer. It is therefore possible to set RF mode invalid, so that RF mode is not set even if the MF ring 204 has been slid to the second position (refer to S109 and S111 in FIG. 8, which will be described later, and S54 in FIG. 10A etc.).

The power supply circuit 130 is connected to the battery 108, and performs smoothing and boosting etc. of the power supply voltage to supply power to each of the circuits and each of the members within the camera body 100 and the interchangeable lens 200.

The camera body communication circuit 131 of the camera body has a synchronization signal terminal and a plurality of communication terminals, such as data terminals, provided on a mount section at an outer part of the camera body 200. Communication is carried out between the body CPU 121 and the lens CPU 221 by means of the camera body communication circuit 131 lens communication circuit 229. Communication between the camera body communication circuit 131 of the camera body and the lens communication circuit 229 is carried out by asynchronous communication when the body and the detachable lens are initially attached, but after acquiring information on the interchangeable lens at the camera body side communication is carried out using synchronous communication provided that the attached interchangeable lens 200 is capable of synchronous communication. Detailed operation of this synchronous communication will be described later using FIG. 7.

The lens CPU 221 is provided within the lens control circuit 201. A lens drive circuit 222, lens position detection circuit 223, MF ring position detection circuit 224, MF position detection circuit 225, index position detection circuit 226, aperture drive circuit 227, RAM 228, and lens communication circuit 229 are connected to this lens CPU 221.

The lens CPU 221 carries out control within the interchangeable lens 200 in accordance with programs and various adjustment values that have been stored in a flash ROM (not shown) provided within the interchangeable lens, output signals from the lens position detection circuit 223, MF ring position detection circuit 224, MF position detection circuit 225, and index position detection circuit 226, and control instructions from the body CPU 121. Specifically, the lens CPU 221 carries out various drive control such as lens drive of the focus adjustment lens 203 and aperture drive of the aperture 205. Also, the lens CPU 221 carries out communication with the body CPU 121 by means of the camera body communication circuit 131 and the lens communication circuit 229, to receive operation instructions from the body CPU 121 and transmit information representing the lens state, such as lens operating state and optical data of the interchangeable lens 200.

Figure 8:
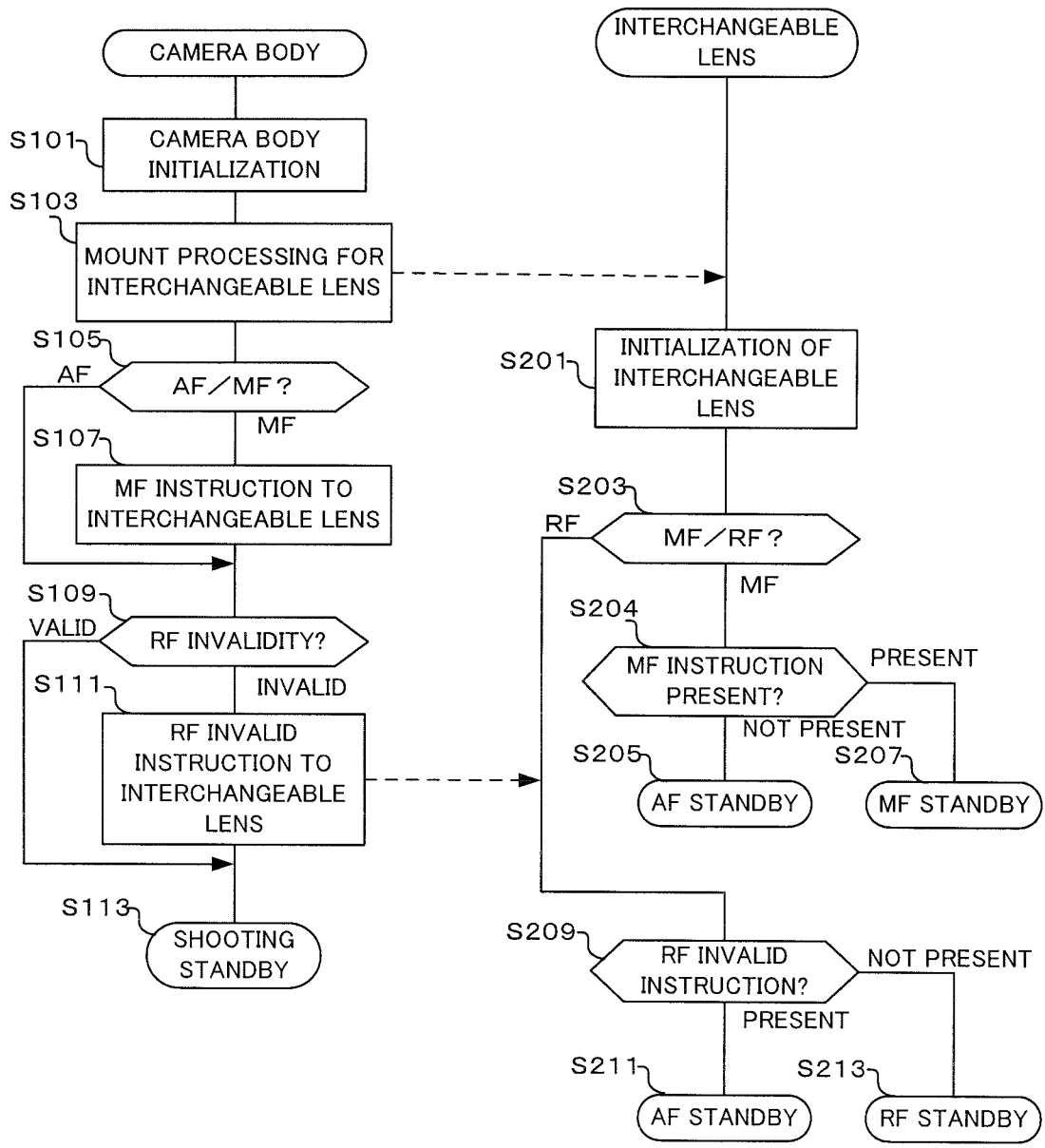
FIG. 8 is a flowchart showing operation of the camera body and the interchangeable lens of the first embodiment of the present invention.
Figure 10A:
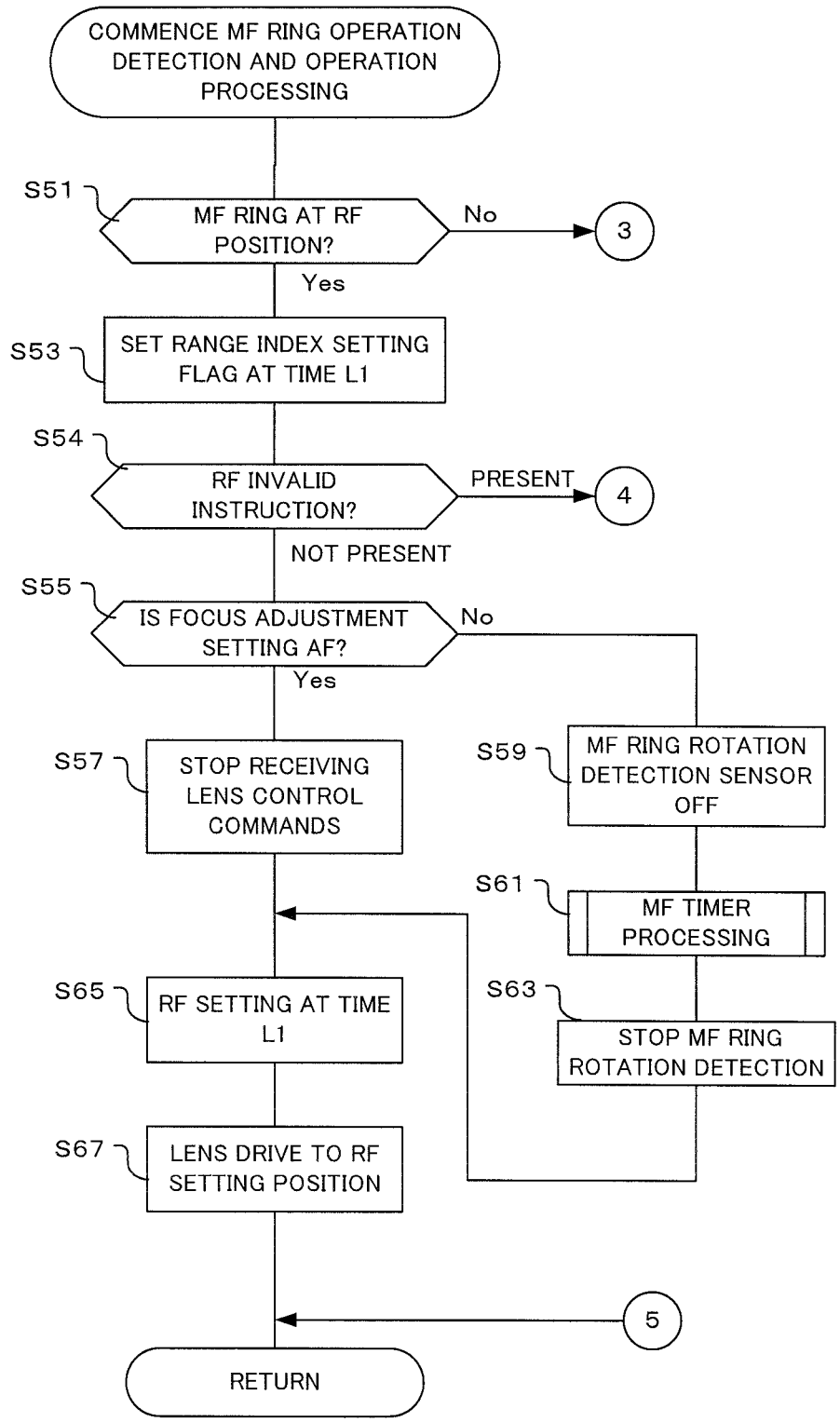
FIG. 10A and FIG. 10B are flowcharts showing MF ring operation detection and operation processing in the modified example of operation of the camera body and the interchangeable lens of the first embodiment of the present invention.
Figure 10B:
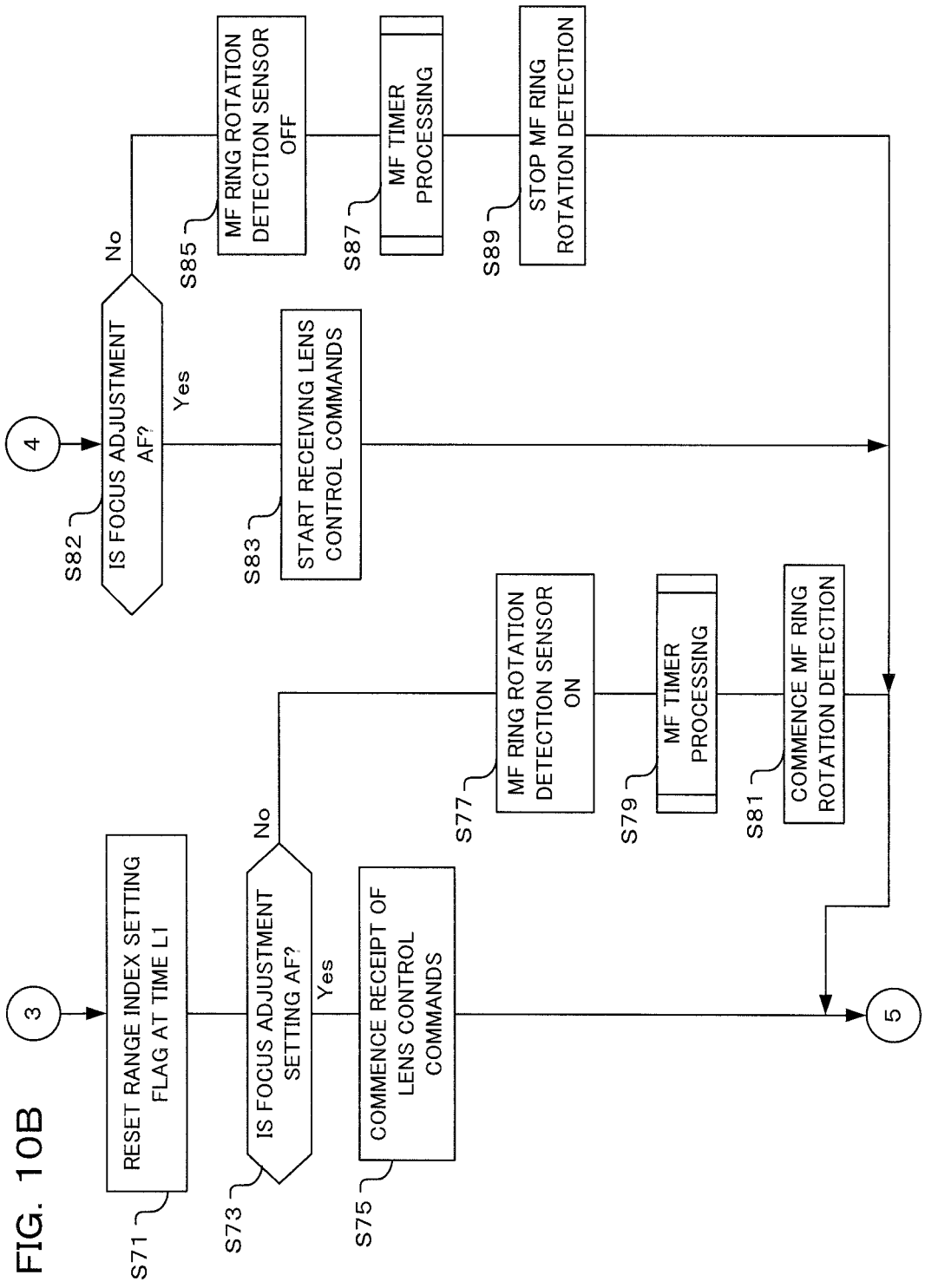
Figure 12:
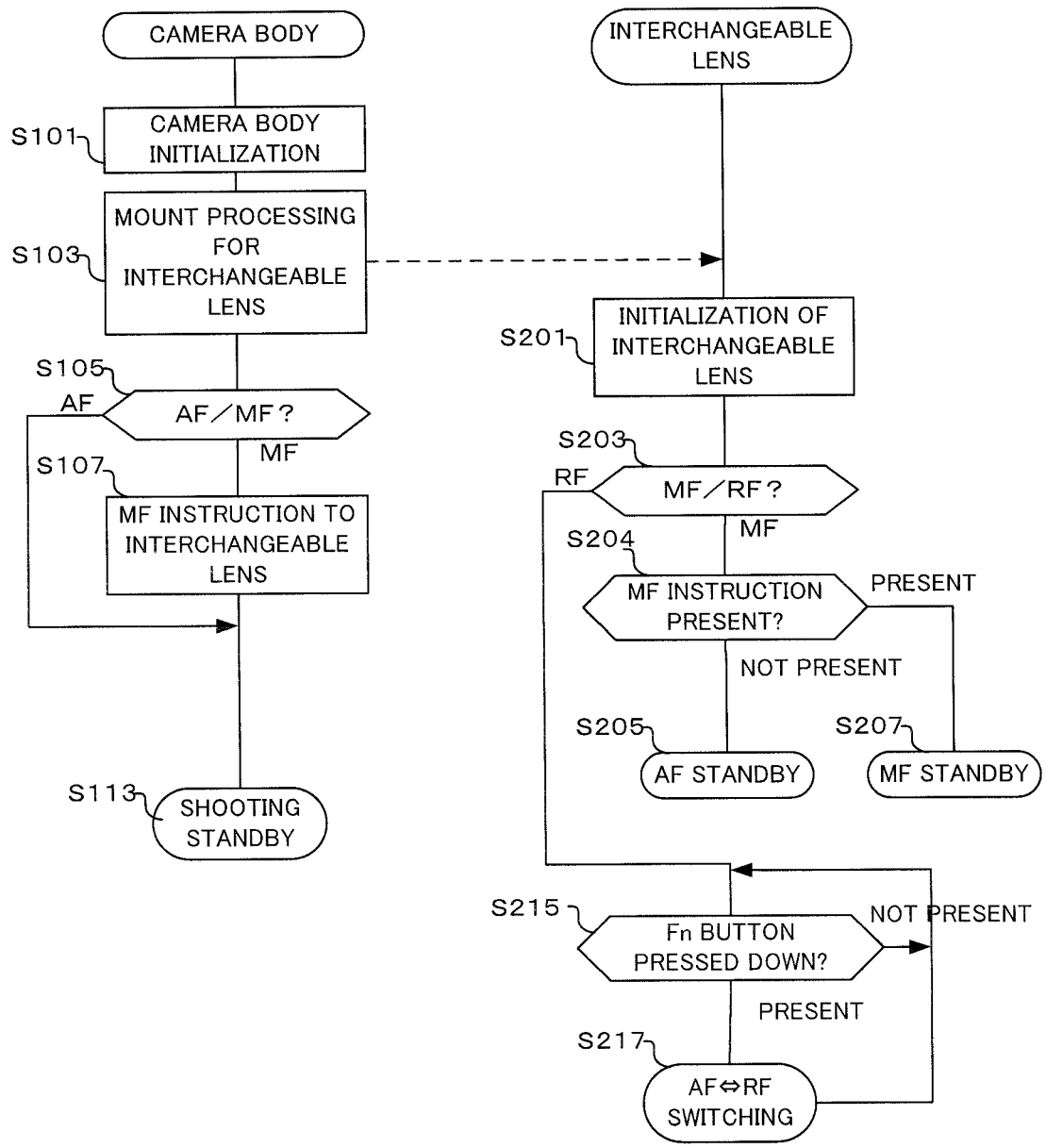
FIG. 12 is a flowchart showing a modified example of operation of the camera body and the interchangeable lens of a second embodiment of the present invention.

The lens CPU 221 functions as a first control section for carrying out manual focus control by detecting rotation direction and rotation amount of the operation member using a second detection section, in accordance with a manual focus mode command from mode setting section when the operation member is at the first position (MF position) (refer, for example, to S207 in FIG. 8, S77-S81 in FIG. 10B, and S207 in FIG. 12 etc.).

The lens CPU 221 also functions as a second control section for, when the operation member is at the second position, regardless of a command from the mode setting section, notifying a result of detection by a first detection section to the camera body, detecting rotational position of the operation member using a third detection section, and forcibly carrying out manual focus control based on the rotational position (refer, for example, to S213 in FIGS. 8, S65 and S67 in FIG. 10A, S217 in FIG. 12, and S65 and S67 in FIG. 13, etc.).

It should be noted that the body CPU 121 described previously functions as a function restriction section for setting operation of the second control section to valid or invalid (for example, S109 and S111 in FIG. 8 and S54 in FIG. 10A). In this case, the function restriction section is provided in the camera body. In a second embodiment, which will be described later, and a modified example of the second embodiment, the function button 26 and the lens CPU 221 function as a function restriction section for setting operation of the second control section to valid or invalid (refer, for example, to S215 in FIG. 12 and S54A in FIG. 13). In this case, the function restriction section is provided in the interchangeable lens.

The lens drive circuit 222 includes an actuator, such as a stepping motor, and a motor driver, and carries out drive control of the focus adjustment lens 203 in the optical axis direction. Also, in the case where focusing is carried out in range focus mode (RF mode), which will be described later, the lens drive circuit 222 carries out braking (acceleration and deceleration) control of the focus adjustment lens 203 using synchronization signals for synchronous communication from the camera body 100 as timing signals. The lens drive circuit 222 is also capable of drive control using a so-called wobbling operation where the focus adjustment lens 203 is driven by microscopic amounts in opposite directions.

The lens position detection circuit 223 carries out position detection of the focus adjustment lens 203. This lens position detection circuit 223 includes a photo interrupter (PI) circuit for converting a rotation amount of a drive motor, such as the stepping motor included in the lens drive circuit 222, to a number of pulses. A position detection result represents number of pulses from a reference position such as the infinity end, and this number of pulses represents an absolute position of the focus adjustment lens 203.

The MF ring position detection circuit 224 detects a slide position of the MF ring 204 in the optical axis direction of the interchangeable lens 200. Specifically, the MF ring 204 is set to a manual focus operation position (MF position, first position) when it has been slid towards the front of the interchangeable lens 200, and to a range focus operation position (RF position, second position) when it has been slid towards the rear of the interchangeable lens 200. In this way the MF ring 204 can be moved to these two positions. The MF ring position detection circuit 224 detects whether or not the MF ring 204 is at the first position or at the second position. The MF ring position detection circuit 224 functions as a first detection section for detecting position of the operation member. This position detection mechanism will be described later using FIG. 5.

The MF position detection circuit 225 includes a PI circuit, and detects an amount of relative positional change of the MF ring 204 in the rotation direction about the optical axis center of the interchangeable lens 200. Specifically, when the position of the MF ring 204 that has been detected by the MF ring position detection circuit 224 is the manual focus operation position (MF position, first position), the MF position detection circuit 225 detects rotation direction, rotation amount, rotational speed, etc. of the MF ring 204 based on pulse signals output from the PI circuit. A detection timer used in rotation detection of this MF ring 204 is a common built-in timer within the lens CPU 221. The MF position detection circuit 225 functions as a second detection section for detecting rotation direction and rotation amount of the operation member when the operation member is at the first position as a result of a slide operation. The structure of the photo interrupter of the PI circuit will be described later using FIG. 5.

The index detection circuit 226 includes a linear encoder and an A/D conversion circuit etc., and carries out detection of range index corresponding to drive target position of the focus adjustment lens 203. Specifically, when position of the MF ring 204 that has been detected by the MF ring position detection circuit 224 is the range focus position (RF position, second position), the index detection circuit 226 carries out detection of range index position based on a result of A/D conversion of an encoder value. This range index position corresponds to drive target position set by rotation direction position of the MF ring 204 having the optical axis of the interchangeable lens 200 as a center. That is, the index detection circuit 226 carries out detection of absolute distance that has been set by the MF ring 204. The index detection circuit 226 functions as a third detection section for detecting rotation position of the operation member when the operation member is at the second position as a result of a slide operation.

A mode for controlling the focus adjustment lens 203 so as to be equivalent to a distance determined by the absolute position of the MF ring 204 in the rotation direction, when there has been a slide operation of the MF ring 204 to the RF position (second position), is referred to as range focus mode (RF mode). As a timing signal for a detection timer used when reading this encoder value, use is made of a lens communication synchronization signal for carrying out synchronous communication between the camera body 100 and the interchangeable lens 200. The structure of one example of a detection mechanism of the index detection circuit 226 that uses a linear encoder will described later using FIG. 6.

The aperture drive circuit 227 includes an actuator, such as a stepping motor, and a motor driver, and carries out opening operation control of the aperture 205 in accordance with an aperture value from the lens CPU 221.

The RAM 228 is a volatile memory for temporarily storing various information used by the lens CPU 221.

The lens communication circuit 229 has a synchronization signal terminal, and a plurality of communication terminals, such as data terminals, provided on a mount section at an outer part of the interchangeable lens 200, and engages with communication connection terminals of the camera body communication circuit 131 to carry out communication with the camera body. The lens CPU 221 receives control commands for the focus adjustment lens 203 and the aperture 205 from the body CPU 221 via this lens communication circuit 229, and transmits lens state information such as optical data, lens position information, and operating state to the body CPU 221. Also, a function button detection circuit 230 detects operating state of the function button 26, and outputs this detection signal to the lens CPU 221.

Figure 3:
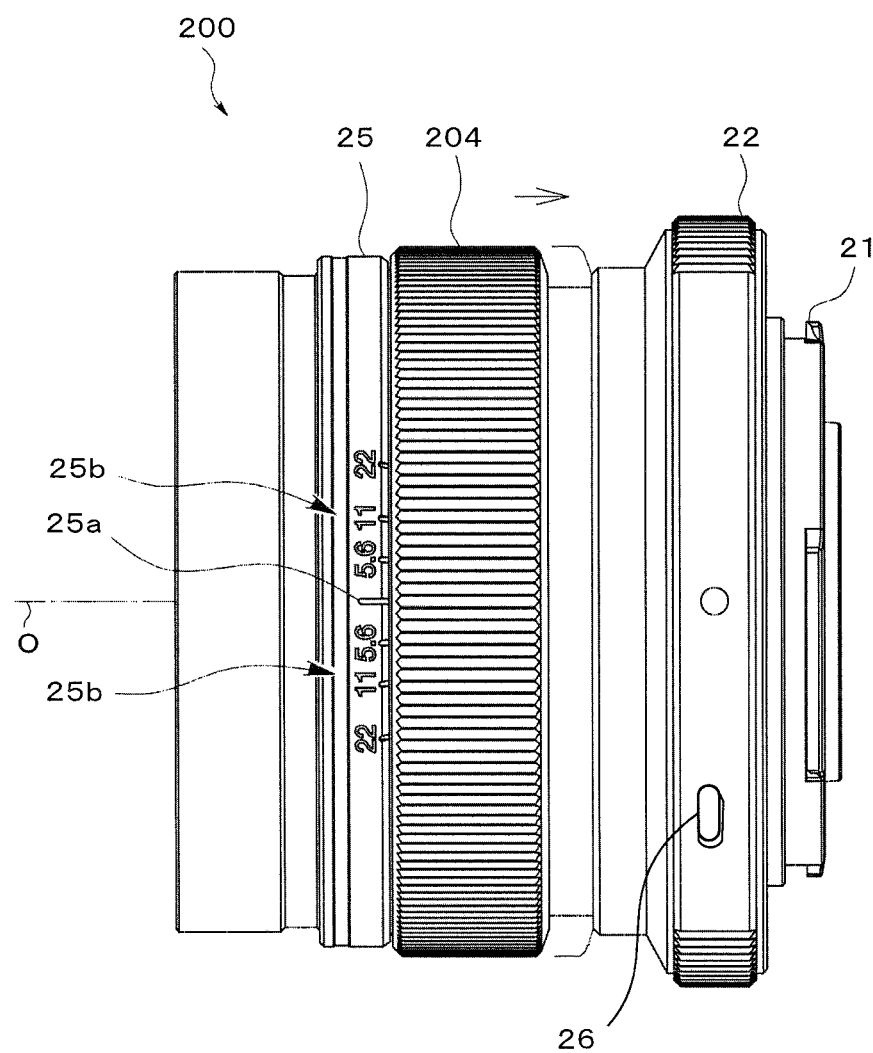
FIG. 3 is a plan view of a lens barrel of a camera of the first embodiment of the present invention, in a state where an MF ring is positioned at a first position.
Figure 4:
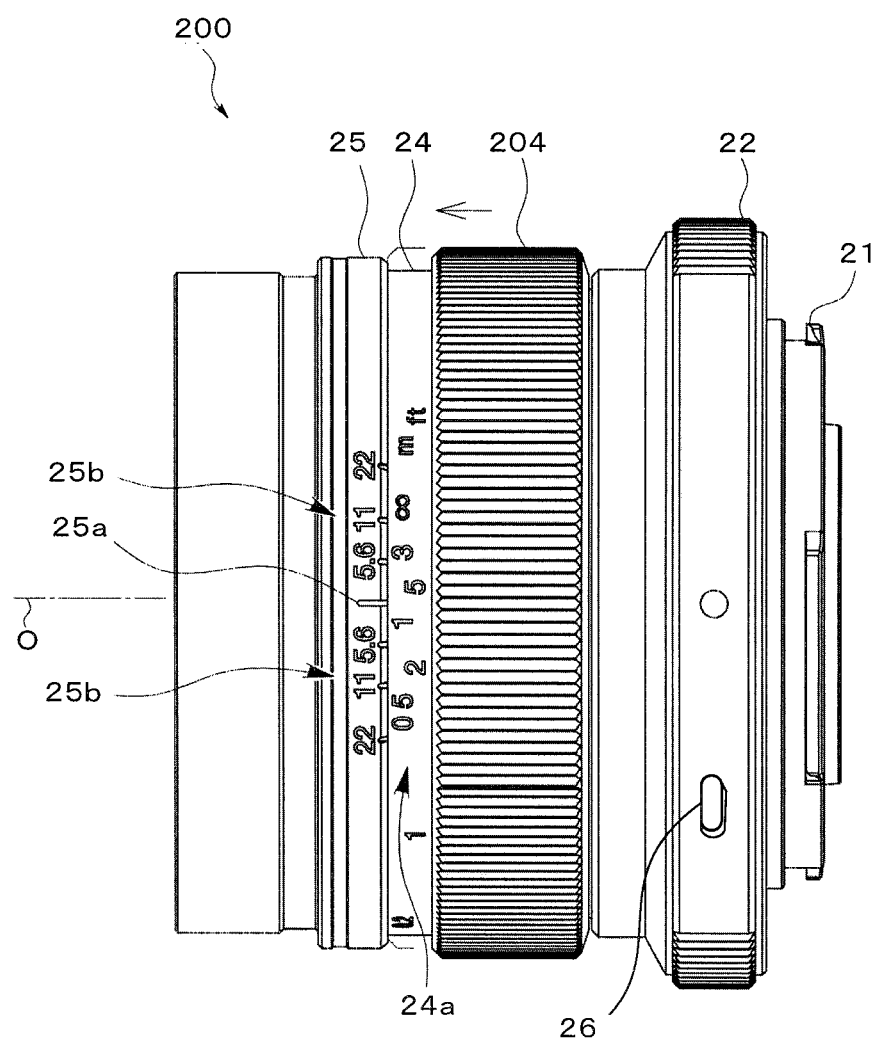
FIG. 4 is a plan view of a lens barrel of a camera of the first embodiment of the present invention, in a state where the MF ring is positioned at a second position.

Next, slide operation of the MF ring 204 to the first position and the second position will be described using FIG. 3 and FIG. 4. FIG. 3 shows the case where the MF ring 204 is at the first position, and FIG. 4 shows the case where the MF ring 204 is at the second position.

A bayonet section 21 is provided on the rear of the interchangeable lens 200. This bayonet section 21 is capable of attaching the interchangeable lens 200 to the camera body 100 by engaging with a bayonet section on the camera body 100. A base 22 is integrally formed with the bayonet section 21, and if the bayonet section 21 is attached to the camera body 100 it is fixed to the camera body 100.

The function button (also referred to as Fn button) 26 is also provided on the base 22. This function button 26 is capable of being assigned functions in accordance with the user's intentions. Allocation of functions of the function button 26 may be set at the camera body 100 side. The function button 26 has a switch that operates in response to the button being pressed down, and the state of this switch is output to the lens CPU 221.

The MF ring 204 has a substantially cylindrical shape arranged capable of turning about an optical axis O, and capable of reciprocal movement in the optical axis O direction, at an outer peripheral section of a lens barrel of the interchangeable lens 200. The MF ring 204 is exposed on the outer periphery of the lens barrel, and is arranged so as to be held by a photographer's fingers. It is also possible to have a structure where only a part of the MF ring 204 is exposed on the outer periphery.

An index display frame 25 is part of an outer member of the lens barrel, and has its position fixed with respect to the base section 22. The index display frame 25 is arranged further to the front than the MF ring 204, even if the MF ring 204 is at the first position (MF position). An index 25a and a subject depth index 25b are displayed in this index display frame 25. The index 25a is an index showing a reference index of a distance scale 24a (refer to FIG. 4) provided on a distance display ring 24, which will be described later, while the subject depth index 25b is an index showing subject depth corresponding to aperture value of the aperture 205 with respect to the distance scale 24a.

In the state shown in FIG. 3, if the photographer subjects the MF ring 204 to a slide movement along the optical axis O to the rearward second position (imaging side, camera body side), then the distance display ring 24 is exposed, as shown in FIG. 4. The distance display ring 24 is a substantially cylindrical member arranged at an inner side of the MF ring 204, and, when the MF ring 204 is at the first position, does not move integrally with the MF ring 204. However, if the MF ring 204 is moved to the second position, the distance display ring 24 is capable of turning integrally with the MF ring 204 about the optical axis O.

As shown in FIG. 4, the distance scale 24a showing the distance at which the focus adjustment lens 203 is focused (in-focus distance) is shown on the outer peripheral surface of the distance display ring 24. The distance scale 24a has numerical values arrayed along a circumferential direction, representing distance from the minimum in-focus distance to infinity. By turning the distance display ring 24 around the optical axis O with respect to the index display frame 25, the numerical value of the distance scale 24a pointed to by the index 25a is changed.

The distance display ring 24 has a restricted range of rotation about the optical axis O, and is only capable of turning within the distance range indicated by the index 25a. Accordingly, the distance scale 24a displays numerical values of distance from the minimum in focus distance to infinity, with respect to the index 25a.

In this manner, with this embodiment, when the MF ring 204 is positioned at the first position (MF position), as shown in FIG. 3, the distance scale 24a of the distance display ring 24 is in a state where it can not be seen from the outside of the lens barrel. On the other hand, when the MF ring 204 is positioned at the second position (RF position), as shown in FIG. 4, the distance scale 24a is in a state where it can be seen from the outside of the lens barrel.

The distance display ring 24 is constructed so as to turn about the optical axis O together with the MF ring 204 only when the MF ring 204 is at the second position, as was described previously, and when the MF ring 204 is at the first position (MF position) the MF ring 204 is capable of turning independently of the distance display ring 24.

Figure 5:
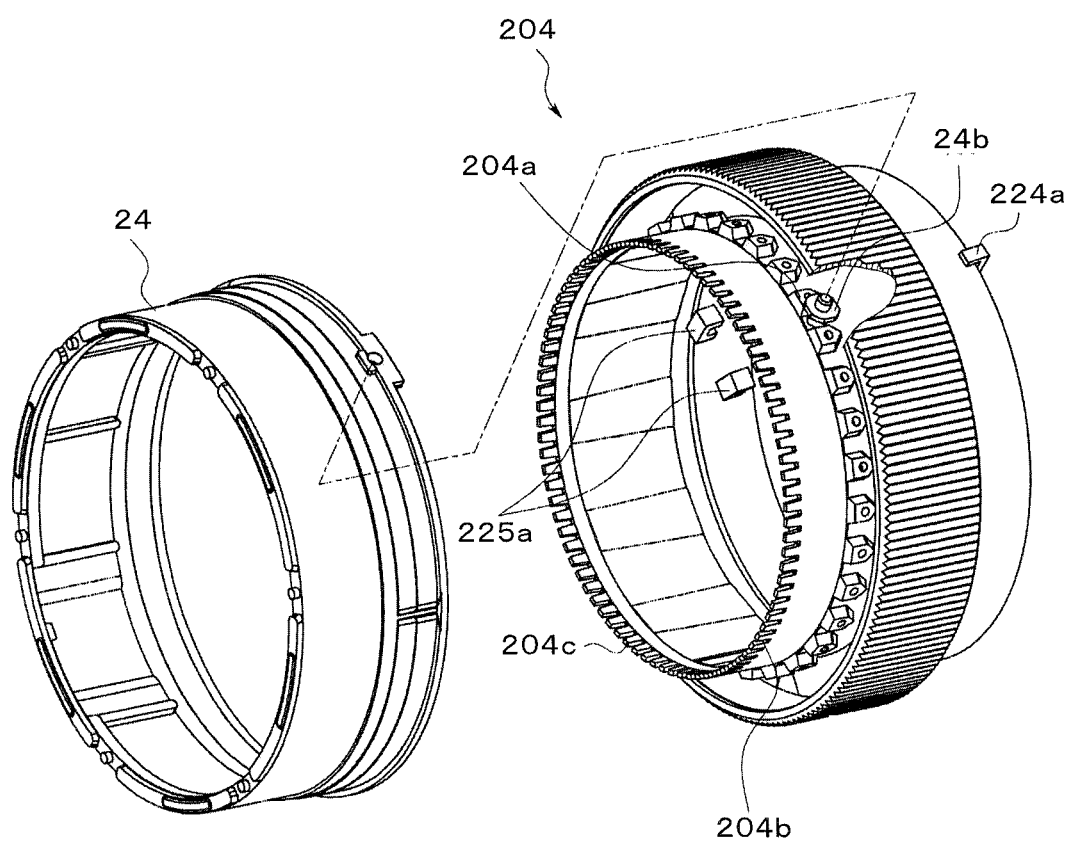
FIG. 5 is a perspective view for describing engagement of an MF ring and a distance display ring, with the camera of the first embodiment of the present invention.

Specifically, as shown in FIG. 5, an engagement pin 24b that projects radially inward is provided at an inner part of the distance display ring 24. Also, a plurality of engagement sections 204a are arranged on an inner cylindrical section 204b of the MF ring 204. When the MF ring 204 is at the first position (MF position), the engagement pin 24b is further to the rear than the engagement sections 204a of the MF ring 204, and even if the MF ring 204 is turned around the optical axis O it is at a position that does not interfere with the engagement sections 204a. Also, when the MF ring 204 is at the second position (RF position), the engagement pin 24b is arranged at a position that overlaps the engagement sections 204a. Accordingly, when the MF ring 204 is at the second position the distance display ring 24 turns about the optical axis O together with the MF ring 204, while when the MF ring 204 is at the first position, the distance display ring 24 remains stationary without turning even if the MF ring 204 is turned about the optical axis O.

Next, the structure of the detection mechanism for the MF ring position detection circuit 224 and the MF position detection circuit 225 will be described using FIG. 5. The MF ring position detection circuit 224 has a photo interrupter section 224a. This photo interrupter section 224a is fixed to the base section 22 or to a member integrally constituting the base section 22, and when the MF ring 204 is positioned at the second position the photo interrupter section 224a is at a position where at least a part of the MF ring 204 enters into a detection range, and when the MF ring 204 is positioned at the first position the photo interrupter section 224a is provided at a position outside the detection range.

With this embodiment, position of the MF ring 204 is detected by the photo interrupter section 224a, but means of detection is not limited to a photo interrupter, and another detection sensor may be adopted as long as it is capable of detecting the position of the MF ring 204. For example, it is possible to use a magnetic sensor or switch etc.

The MF position detection circuit 225 has a pair of photo interrupters 225a. Also, a plurality of slit holes 204c provided a given distance apart are provided in a circumferential direction of an inner cylinder 204b that turns integrally with the MF ring 204. The pair of photo interrupters 225a are provided within a detection range of the slit holes 204c when the MF ring 204 is at the first position (MF position). Rotational conditions such as the rotation direction, rotation amount, and rotation speed of the MF ring 204 about the optical axis O are then detected based on output signals from the pair of photo interrupters 225a.

It should be noted that the detection sensor of the MF position detection circuit 225 can also be a magnetic rotary encoder or the like, for example, as long as it is capable of detecting rotation of the MF ring 204 when the MF ring 204 is at the first position (MF position).

Next, the detecting mechanism of the index position detection circuit 226 will be described using FIG. 6. The index position detection circuit 226 has an encoder section 226a. This encoder section 226a detects absolute rotation position about the optical axis O, with respect to the base section 22 of the distance display ring 24. The encoder section 226a comprises a plurality of code patterns 226b of a given number of bits formed from conductive bodies, and a contact point section 226c formed from conductive bodies that slide on the code patterns 226b.

The code patterns 226b are arranged on the outer peripheral part of the distance display ring 24, while the contact point section 226c is arranged on a fixed frame formed integrally with the base section 22. If the distance display ring 24 is rotated about the optical axis O, the positions of the code patterns 226b connecting to the contact point section 226c vary in accordance with the rotation position. The index position detection circuit 226 detects changes in connection state between the code patterns 226b and the contact point section 226c, and detects absolute rotational position of the MF ring 204 about the optical axis O.

The index position detection circuit 226 may also adopt a structure other than a contact point type encoder, as long as it is capable of detecting absolute rotational position about the optical axis O, with respect to the base section 22. For example, it is also possible to have an optical or magnetic rotary encoder for absolute position detection, and it is also possible to have a potentiometer whose resistance varies in accordance with rotational position of the distance display ring 24 about the optical axis O. Also, in this embodiment, in the detection of absolute position, lens communication synchronization signals at the time of synchronous communication between the camera body 100 and the interchangeable lens 200 are used as detection timing signals in order to carry out detection at high-speed.

Figure 7:
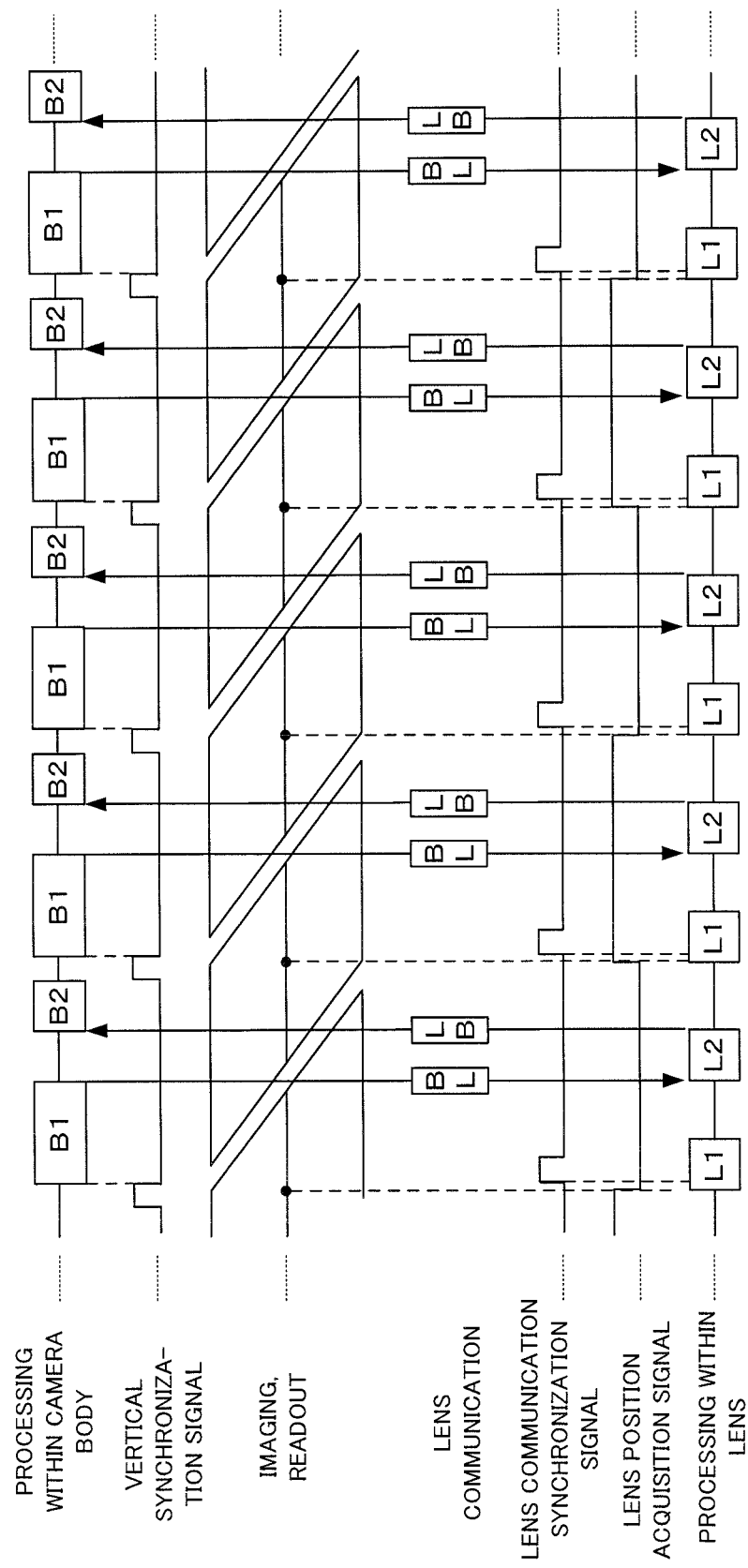
FIG. 7 is a timing chart showing one example of synchronous communication between an interchangeable lens and a camera body, in the camera of the first embodiment of the present invention.

Next, one example of synchronous communication that is performed between the camera body 100 and the interchangeable lens 200 will be described using FIG. 7. In FIG. 7, the horizontal axis represents the flow of time, while the vertical axis represents respective processing content and timing. In the camera body processing, in process B1 live view image display and calculation of an AF evaluation value are carried out based on image data that was acquired in the previous frame. Also, in process B2 AF calculations and various setting changes etc. are carried out based on lens state data that was acquired from lens state communication.

A vertical synchronization signal is a signal that is output in correspondence with each frame. With imaging and readout, a subject image is formed on the image sensor 103, and image data of this formed image is read out. The imaging and readout have a rhombus shape in FIG. 7, which is because in this embodiment, at the time of acquiring a live view image a rolling shutter is adopted, and imaging and readout are carried out sequentially every pixel line.

With the communication BL of the lens communication, a lens state data request command is transmitted from the camera body 100 to the interchangeable lens 200. This lens state data request command requests transmission of data representing the lens state of the interchangeable lens 200 to the camera body 100. Also in the communication BL, the interchangeable lens 200 transmits data representing the lens state of the interchangeable lens 200 to the camera body 100 in response to the lens state data request command.

The lens communication synchronization signal is generated in response to a vertical synchronization signal in the camera body 100. This lens communication synchronization signal is output to the interchangeable lens 200 from the synchronization signal terminal of the camera body communication circuit 131. A lens position acquisition signal changes state at a given time, for example, with the example shown in FIG. 7, at a time point after a time point substantially at the central point time of a charge accumulation time of the image sensor 103.

Also, processing L1 within the interchangeable lens 200 is processing to acquire position information of the focus adjustment lens 203 at a time when the lens position acquisition signal changes state, and detect operating state of the MF ring 204 at a time when the lens communication synchronization signal is received. Also, processing L2 is processing to transmit position information of the focus adjustment lens 203 and lens state data such as operating state of the MF ring 204, in response to a lens state data request command that has been received from the camera body 100.

As shown in the timing chart of FIG. 7, with the synchronous communication of this embodiment, processing B1 within the camera body 100 is executed in synchronization with the vertical synchronization signal, and a lens communication synchronization signal is transmitted to the interchangeable lens 200 in synchronization with the vertical synchronization signal.

Once processing B1 within the camera body 100 has been processed, a lens state data request command is transmitted to the interchangeable lens 200 by communication BL. Once the interchangeable lens 200 has received the lens state data request command, the lens state is detected and lens state data is transmitted by communication LB. The camera body 100 receives the lens state data and then executes processing B2.

Also, within the interchangeable lens 200, processing L1 for acquiring lens position is executed in synchronization with a lens position acquisition signal. This lens position acquisition signal is generated at a given time, and with the example shown in FIG. 7, as was described previously, at a time point after half of a charge accumulation time has elapsed at the screen center of the image sensor 103. The interchangeable lens 200 acquires position information of the focus adjustment lens 203 using the lens position detection circuit 223, at the time when the lens position acquisition signal changes state. These synchronous communications are all executed in synchronization with the lens communication synchronization signal.

Next the focusing modes of this embodiment will be described. In this embodiment, three focusing modes have been implemented, namely auto focus mode (AF mode), manual focus mode (MF mode) and range focus mode (RF mode).

AF mode is carrying out automatic focusing of the focus adjustment lens 203 using a climbing method that uses contrast AF, based on image data from the image sensor 103. MF mode is carrying out focusing, when the MF ring 204 is at the first position (MF position), by the photographer manually rotating the MF ring 204 and moving the focus adjustment lens 203 in accordance with the rotation state at this time. AF mode and MF mode are set on the camera body 100 on menu screens, for example, as was described previously.

Differing from AF mode and MF mode, RF mode involves carrying out distance setting by the photographer rotating the MF ring 204, when the MF ring 204 is at the second position, and aligning the distance scale 24a of the distance display ring 24 with the index 25a, and then carrying out focusing to this set distance. After the distance has been set beforehand in RF mode, if the power supply is turned off and then after that the power supply is turned on in RF mode, it is possible to focus to the distance that was set beforehand. For example, when the photographer is strolling through a town etc., if a distance has been set beforehand in RF mode, then it is possible to rapidly take a shot even if a subject suddenly comes into view.

Also, after distance setting in RF mode, even if MF mode or AF mode have been switched to by sliding the MF ring 204 to the first position (MF position), if the MF ring 204 is slid to the second position focusing is immediately carried out to the set distance.

Next, a shooting operation of this embodiment will be described using the flowchart shown in FIG. 8. Operation in the camera body, on the left side of this flowchart (the same also applies to FIG. 12 which will be described later) is executed by the body CPU 121 in accordance with a program stored in the flash ROM 122 within the camera body 100. On the other hand operation in the interchangeable lens on the right side of the flowchart of FIG. 8 is executed by the lens CPU 221 in accordance with a program stored in the flash ROM within the interchangeable lens 200.

If the camera body 100 is powered on, the flow shown in FIG. 8 is commenced. First, operation of the camera body will be described. Once flow is commenced, the camera body is initialized (S101). Here, flags etc. within the camera body 100 are reset, and mechanical structures are reset.

Once initialization of the camera body has been carried out, next mount processing of the interchangeable lens is carried out (S103). Here, communication is carried out between the body CPU 121 and the lens CPU 221 by means of the camera body communication circuit 131 and lens communication circuit 229.

Once mounted processing of the interchangeable lens has been carried out, it is next determined whether focus mode has been set to AF or set to MF (S105). AF mode and MF mode are set by the photographer on menu screens. In this step determination is for which of these modes has been set.

If the result of determination in step S105 is that MF mode has been set, an MF instruction is issued to the interchangeable lens (S107). Here, the body CPU 121 instructs the fact that MF mode has been set to the lens CPU 221. It should be noted that the lens CPU 221 recognizes AF mode in the initial state, and in the event that MF mode has not been instructed it is recognized that AF mode is set at the body side. The body CPU 121 does not, therefore, carry out instruction for AF mode.

If MF instruction has been issued to the interchangeable lens in step S107, or if the result of determination in step S105 is that AF mode has been set, it is next determined whether or not RF invalid is present (S109). Setting is possible on a menu screen to make RF mode setting invalid, even if the MF ring 204 has been slid to the second position. In this step, therefore, determination is based on setting states on the menu screen.

If the result of determination in step S109 is that RF invalid in present, an RF invalid instruction is issued to the interchangeable lens (S111). Here an RF invalid instruction is issued by the body CPU 121 to the lens CPU 221 so that RF mode processing is not carried out even if RF mode has been set.

If an RF invalid instruction has been issued to the interchangeable lens in step S111, or if the result of determination in step S109 was that RF is valid, a shooting standby state is entered (S113). Here an AE operation and AF operation are carried out with the release button pressed down half way, or shooting operation is carried out with the release button pressed down fully. It should be noted that if the determinations in steps S105 and S109 are carried out or changed as required even during shooting standby, an instruction is issued to the interchangeable lens.

Next operation of the interchangeable lens in the flow shown in FIG. 8 will be described. The interchangeable lens 200 is supplied with power from the camera body 100, and operation of the interchangeable lens 200 also commences if the camera body 100 is powered on.

In step S103, communication is carried out between the camera body 100 and the interchangeable lens 200, and once communication is established initialization of the interchangeable lens is carried out (S201). Here, flags etc. within the interchangeable lens 200 are reset, and mechanical structures are reset.

Once initialization of the interchangeable lens has been carried out, it is next determined whether the MF ring has been set at the MF position or at the RF position (S203). The MF ring position detection circuit 224 determines slide position of the MF ring 204 in the optical axis direction, and specifically determines whether the MF ring 204 has been slid toward the front of the interchangeable lens 200 to be at the manual focus operation position (MF position, first position), or has been slid to the rear of the interchangeable lens 200 to be at the range focus operation position (RF position, second position). In this step it is determined whether the MF ring 204 is at the MF position or at the RF position based on a detection result of the MF ring position detection circuit 224.

If the result of determination in step S203 is that the MF ring 204 is set to the MF position, next presence or absence of an MF instruction is determined (S204). If MF mode has been set on a menu screen, the camera body 100 transmits an MF instruction to the interchangeable lens 200 in step S107. In this step, therefore, determination is based on an instruction from the camera body 100. Also, the camera body 100 does not transmit an MF instruction if AF mode has been set (S105). The lens CPU 221 therefore recognizes that the camera body has been set to AF mode if there is no MF instruction from the body CPU 121.

If the result of determination in step S204 is that an MF instruction has not been issued an AF standby state is entered (S205). Since the MF ring 204 is at the MF position and AF mode is set in the camera body 100, the interchangeable lens 200 enters an AF standby state. In this state, if a control signal for focusing is transmitted from the camera body 100 based on a focus detection result, the lens CPU 221 controls the lens drive circuit 222 in accordance with this control signal, and drives the focus adjustment lens 203 to an in-focus position.

On the other hand, if the result of determination in step S204 is that there is an MF instruction, an MF standby state is entered (S207). Since the MF ring 204 is at the MF position, and MF mode has been set in the camera body 100, the interchangeable lens 200 enters an MF standby state. If the photographer manually rotates the MF ring 204 in the state, rotation direction and rotation amount of this rotation operation are detected, and the lens CPU 221 controls the lens drive circuit 222 based on this detection result to drive the focus adjustment lens 203.

If the result of determination in step S203 is that the MF ring 204 is set to the RF position, it is determined whether or not an RF invalid instruction has been performed (S209). If setting for making RF mode invalid is performed on a menu screen of the camera body 100, then in step S111 the RF invalid instruction is performed. In this step, determination is based on whether or not an RF invalid instruction has been received.

If the result of determination in step S209 is that there is an RF invalid instruction, an AF standby state is entered (S211). Although the MF ring 204 is at the RF position, since an RF invalid instruction is received from the camera body 100 an AF standby state is entered. If a control signal for focus based on a result of focus detection is transmitted from the camera body 100 in this state, as described previously, the lens CPU 221 controls the lens drive circuit 222 in accordance with this control signal and drives the focus adjustment lens 203 to an in-focus position.

On the other hand, if the result of determination in step S209 is that there is not an RF invalid instruction, an RF standby state is entered (S213). Since the MF ring 204 is at the RF position, and an RF invalid instruction is not received from the camera body 100, an RF standby state is entered. In this state the MF ring 204 is subjected to a slide operation and positioned at the RF position (second position) (S203: RF), and the focus adjustment lens 203 is controlled so as to focus at a subject distance corresponding to the distance determined in accordance with absolute position of the MF ring 204 in the rotation direction.

If a standby state is entered in steps S205, S207, S211, or S213, and operation of the MF ring 204 etc. is performed in the respective states, or if a control signal is received from the camera body, processing of each mode is executed.

In this way, with this embodiment, if RF invalid is set in the camera body 100 an RF invalid instruction is performed at the interchangeable lens 200 side (S109, S111), and the interchangeable lens 200 is not set to RF mode even if the MF ring 204 is at the RF position (S203, S209, S211). As a result, there is no erroneous setting to RF mode against the will of the photographer.

Next, a modified example of operation of a first embodiment of the present invention will be described using the flowcharts shown in FIG. 9A to FIG. 11. This modified example shows a more specific operation than the first embodiment. This flowchart (the same also applies to FIG. 10A, FIG. 10B, FIG. 11 and FIG. 13, which will be described later) is mainly executed by the body CPU 121 in accordance with a program stored in the flash ROM 122 within the camera body 100. However, in the event that RF mode has been set some steps are mainly executed by the lens CPU 221 in accordance with a program stored in flash ROM within the interchangeable lens 200.

Figure 9A:
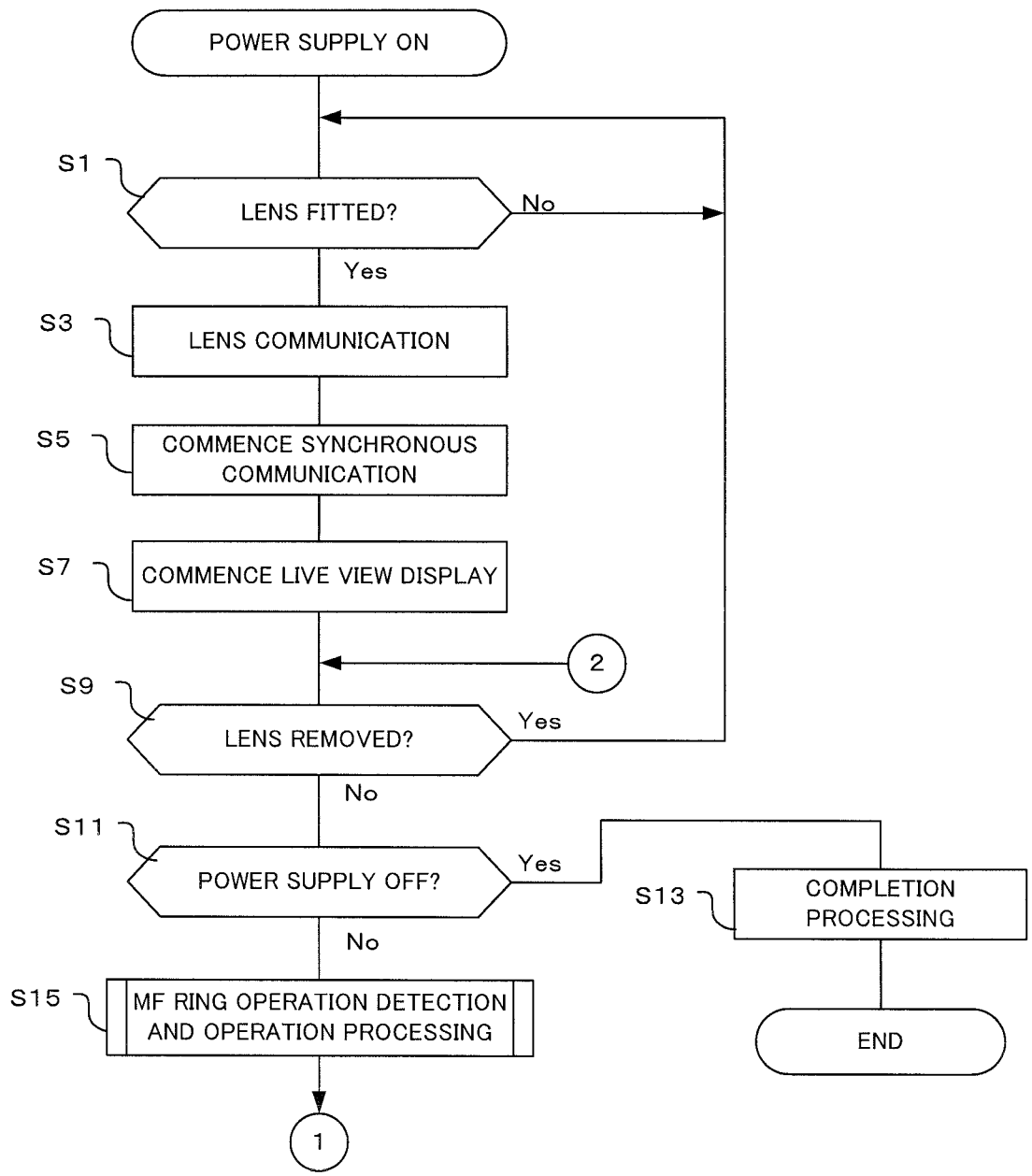
FIG. 9A and FIG. 9B are flowcharts showing a modified example of operation of the camera body and the interchangeable lens of the first embodiment of the present invention.
Figure 9B:
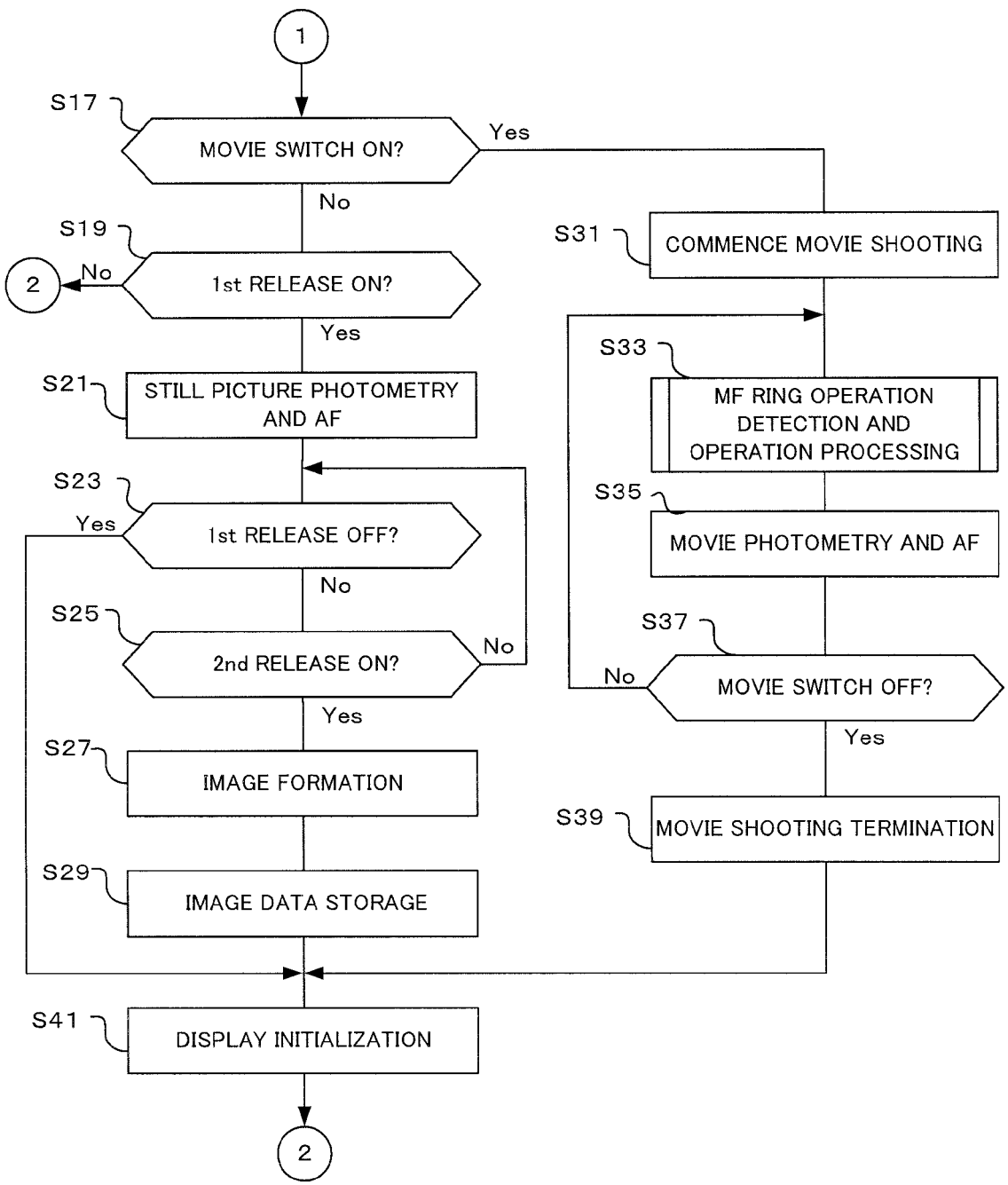

If the operation switch detection circuit 129 detects that the power supply button has been operated, the flowcharts shown in FIG. 9A and FIG. 9B commence operation. First it is determined whether or not the interchangeable lens 200 is attached (S1). Here, the operation switch detection circuit 129 detects the state of a mount switch or the like, and determination is carried out based on the result of this detection. If the result of this determination is that the interchangeable lens 200 is not attached, a standby state is entered waiting for attachment of the interchangeable lens 200. In the event that a shooting parameter change operation or playback operation for previously taken images, or setting of focusing mode, are carried out by the photographer during standby, the designated operation is executed.

If the result of determination in step S1 is that the interchangeable lens 200 has been attached to the camera body 100, lens communication is next carried out (S3). Here, the body CPU 121 carries out asynchronous communication with the lens CPU 221 by means of the camera body communication circuit 131 and the lens communication circuit 229. Using this asynchronous communication, operating parameters of the focus adjustment lens 203 etc., lens data such as optical data like chromatic aberration data, and information as to whether or not synchronous communication is possible etc. are acquired, and stored in the RAM 123.

Once the lens communication has been carried out, synchronous communication commences (S5). Here, as was described using FIG. 7, a lens communication synchronization signal is transmitted from the camera body 100 to the interchangeable lens 200, and communication is carried out in synchronization with this signal. For every synchronization period, operating state of the focus adjustment lens 203 etc. and lens state data such as the operating state of the MF ring 204 are acquired, and control operations corresponding to the lens state are executed. Every time the lens communication synchronization signal is output, the camera body acquires data relating to the lens position of the focus adjustment lens 203, whether the MF ring 204 is at the first position or the second position, and information such as aperture value of the aperture 205, and executes control operations corresponding to this information.

Also, once the synchronous communication of step S5 has commenced, the camera body 100 transmits mode information such as if AF mode has been set or if MF mode has been set. In the event that AF mode has been set, the camera body 100 transmits lens control commands such as drive direction and drive amount of the focus adjustment lens 203 in order to carry out AF control, and aperture control commands relating to narrowing amount of the aperture 205. Further, if RF invalid has been set on a menu screen of the camera body 100, an RF invalid instruction is also transmitted.

As a result of the lens communication that was carried out in step S3, synchronous communication is not carried out in the case where an interchangeable lens that is incapable of synchronous communication has been attached. Also, once synchronous communication has been commenced it is repeatedly executed until the interchangeable lens 200 is removed or power is turned off (refer to FIG. 7).

If synchronous communication has commenced, live view display is next commenced (S7). The body CPU 121 acquires image data by causing the image sensor 103 to be operated every synchronization period by the image sensor control circuit 124. This image data is subjected to image processing for live view display in the image processing circuit 127. The display circuit 128 commences live view display on the display monitor 105 using image data that has been subjected to processing for live view display.

Once live view display has commenced, it is next determined whether or not the interchangeable lens 100 has been removed (S9). Here, determination of whether or not the interchangeable lens 100 has been removed is carried out based on at least one of communication state of the synchronous communication that was commenced in step S5, and, similarly to step S1, the state of a mount switch. If the result of this determination is that the interchangeable lens 100 has been removed, processing returns to Step S1.

If the result of determination in step S9 is that the interchangeable lens 100 has not been removed, and is attached, it is next determined whether or not the power supply is off (S11). Here, the operation switch detection circuit 129 detects the operating state of the power supply button, and the determination is carried out based on the result of this detection. If the result of this determination is that the power supply is off, termination processing is carried out (S13). Here, processing such as save processing for various data, a reset operation and power supply system disconnect processing etc. is carried out. Once termination processing has been carried out, this processing flow is ended.

If the result of determination in step S11 is that the power supply is not off, next MF ring operation detection and operation processing is carried out (S15). Here, operation control and setting processing for the focus adjustment lens 203 is carried out according to the operating state of the MF ring 204. Specifically, in the case where the MF ring 204 is at the second position having been slid to the rear (imaging side) of the interchangeable lens 200, RF mode is executed regardless of whether AF mode has been set or MF mode has been set at the camera body 100. On the other hand, if the MF ring 204 is at the first position having been slid towards the front (subject side) of the interchangeable lens 200, control is carried out in accordance with AF mode or MF mode that has been set at the camera body 100. Detailed processing of the MF ring operation detection and operation processing will be described later using FIG. 10A and FIG. 10B.

Once MF ring operation detection and operation processing has been carried out, it is next determined whether or not a movie switch is on (S17). Here, the operation switch detection circuit 129 detects the operating state of the movie switch, and the determination is carried out based on the result of this detection.

If the result of determination in step S17 is that the movie switch is off, namely that the camera is in still picture shooting mode, it is then determined whether or not the 1st release switch is on (S19). The photographer presses the release button down halfway as a preparation step before shooting. Here the operation switch detection circuit 129 detects the operating state of the 1st release switch, and determination is carried out based on the result of this detection. If the result of this determination is that the 1st release switch is off, processing returns to step S9.

If the result of determination in step S19 is that the 1st release switch is on, still picture photometry and AF are carried out (S21). Here, operations required for shooting, such as photometry for still picture shooting, exposure calculation, AF etc. are executed. Specifically, as photometry, subject brightness is detected based on image data from the image sensor 103. As exposure calculations, exposure control values such as shutter speed and aperture value etc. for correct exposure are calculated based on detected subject brightness. Also, in AF for still picture shooting, an AF operation using a so-called climbing method is carried out so that a high-frequency component (AF evaluation value) that has been extracted from image data becomes a maximum. It is also possible to carry out an automatic focusing operation using phase difference AF.

Once still picture photometry and AF have been carried out, it is next determined whether or not the 1st release switch is off (S23). There will be cases where, after the photographer has pressed the release button down halfway, as shooting preparation, the finger is taken off the release button and the shooting preparation operation is stopped. Here the operation switch detection circuit 129 detects the operating state of the 1st release switch, and determination is carried out based on the result of this detection. If the result of this determination is that the 1st release switch is off, processing advances to step S41, which will be described later.

On the other hand, if the result of determination in step S23 is that the 1st release switch is not off, namely that it is on, it is next determined whether or not the 2nd release switch is on (S25). If the photographer monitors the live view display and has determined composition and shutter timing, the release button is pressed down fully and execution of shooting is instructed. Here the operation switch detection circuit 129 detects the operating state of the 2nd release switch, and determination is carried out based on the result of this detection. If the result of this determination is that the 2nd release switch is off, step S23 is returned to.

If the result of determination in step S25 is that the 2nd release switch is on, there is a transition to a shooting operation. First, imaging is carried out (S27). Here, the body CPU 121 performs communication with the lens CPU 221 based on results of the exposure calculation that was calculated in step S21, instructs a stopping down operation of the aperture 205, and after the stopping down operation is complete controls the image sensor 103 and the focal plane shutter 104 using the image sensor control circuit 124 and the shutter control circuit 126, to carry out a shooting operation. After completion of the shooting operation, image data is acquired by subjecting image signals that have been read out from the image sensor 103 to processing by the image processing circuit 127.

Once imaging has been carried out, storage of image data is next carried out (S29). Here, the body CPU 121 stores image data that was acquired in step S27 in the RAM 123 or an external storage memory such as Compact Flash (registered trademark). Also, based on the acquired image data, that taken image is displayed on a display monitor by means of a display circuit 127 for a specified period.

If the result of determination in step S17 was that the movie switch was on, movie shooting mode is entered. First, movie shooting is commenced (S31). The body CPU 121 commences movie shooting by causing the image sensor 103 to be operated every synchronization period by the image sensor control circuit 124. Image signals that are output from the image sensor 103 are subjected to image processing for a movie by the image processing circuit 127, and storage of this movie image data in the RAM 123 or an external storage medium such as Compact Flash (registered trademark) is commenced.

Once movie shooting has commenced, MF ring operation detection and operation processing are carried out (S33). Here, as in step S15, operation control and setting processing for the focus adjustment lens 203 is carried out by the body CPU 121 according to the operating state of the MF ring 204.

Once MF ring operation detection and operation processing has been carried out, next movie photometry and AF are carried out (S35). As AE for movie shooting, control is carried out by the body CPU 121 to drive the aperture 205 using the aperture drive circuit 227 in a drive step that is finer than at the time of still picture shooting, so that variation in subject light amount incident on the image sensor 103 becomes uniform. Also, in the case of AF mode, AF for movie shooting involves carrying out a climbing AF operation, and execution of a so-called wobbling operation close to an in-focus state, as required. The wobbling operation is an operation for focus detection while driving the focus adjustment lens 203 back and forth by microscopic amounts.

Once movie photometry and AF operation have been carried out, it is next determined whether or not the movie switch is off (S37). When the photographer finishes the movie shooting, a finger is taken off the movie button, and so here the operation switch detection circuit 129 detects the operating state of the movie switch, and determination is carried out based on the result of this detection. If the result of this determination is that the movie switch is on, step S33 is returned to and movie shooting continues.

If the result of determination in step S37 is that the movie switch is off, movie shooting completion processing is carried out (S39). Here, the body CPU 121 finishes movie shooting by causing the image sensor 103 to stop operation using the image sensor control circuit 124.

Once storage of image data has been carried out in step S29, or movie shooting completion has been carried out in step S39, or if the result of determination in step S23 is that the 1st release switch is off, display initialization is next carried out (S41). Here, the body CPU 121 carries out clearing of taken image display or display of movie shooting parameters etc. using the display circuit 127, and returns display on the display monitor 105 to live view display. Once display initialization has been carried out, processing returns to step S9.

Next, MF ring operation detection and operation processing in steps S15 and S33 will be described using the flowcharts shown in FIG. 10A and FIG. 10B. Operations in the flow for MF ring detection and operation processing are executed by the lens CPU 221 under the control of the body CPU 121, but when RF mode is executed main execution is by the lens CPU 221.

If the flow for MF ring operation detection and operation processing is entered, first, it is determined whether or not the MF ring 204 is at the RF position (S51). Here, position of the MF ring 204 is detected by the MF ring position detection circuit 224, and whether or not the MF ring 204 is at the RF position (range focus position, second position) is determined based on the result of this detection.

If the result of determination in step S51 is that the MF ring 204 is at the RF position, a range index setting flag is set at time L1 (S53). The time L1, as was described using FIG. 7, is a time for transmitting a lens communication synchronization signal from the camera body 100 to the interchangeable lens 200. Also, the range index setting flag is a flag indicating that the MF ring 204 has been slid to the RF position and RF mode has been set.

Next it is determined whether or not an RF invalid instruction has been issued (S54). The determination here is determination based on whether or not the lens CPU 221 has received an RF invalid instruction from the camera body 100.

If the result of determination in step S54 is that an RF invalid instruction has been issued, it is next determined whether or not focus adjustment (focus adjustment mode of the camera body) is AF mode (S82 in FIG. 10B). If AF mode has been set, then at the time of synchronous communication, since this information is transmitted, here the lens CPU 221 performs determination based on mode setting information from the camera body 100.

If the result of determination in step S82 is that focus adjustment (focus adjustment mode of the camera body) is AF mode, receipt of lens control commands is commenced (S83). If AF mode has been set, at the time of synchronous communication lens control commands are transmitted from the camera body 100. In this step, therefore, receipt of lens control commands is commenced. In the AF operation (still picture photometry and AF) of step S21, the lens CPU 221 drives the focus adjustment lens 203 based on lens control commands transmitted by the camera CPU 121. It should be noted that even if the MF ring 204 of the interchangeable lens 100 is at the RF position, since the result of determination in step S54 is that RF mode has been subject to an invalid instruction, operation for AF mode is executed without executing operation for RF mode.

On the other hand, if the result of determination in step S82 is that focus adjustment is not AF mode, manual focus control is disabled in steps S85-S89. Specifically, although focus adjustment mode set at the camera body side is MF mode, the result of determination in step S51 is that the MF ring 204 is at the RF position and the result of determination in step S54 is that an RF invalid instruction has been issued, and so even if a rotation operation of the MF ring 204 is carried out manual focus control of the MF mode is not carried out.

First, a rotation detection sensor of the MF ring 204 is turned off (S85). Focus adjustment mode set at the camera body side is MF mode, but even if the MF ring 204 is at the RF position an RF invalid instruction has been issued and operation to detect rotation state is not carried out even if the MF ring 204 is subjected to a rotation operation. The sensor for rotation detection of the MF ring 204, namely the photo interrupter 225a (refer to FIG. 5), is then turned off. In this way unnecessary operation is prohibited, and there is also the effect of reducing power consumption.

Next, MF timer processing is carried out (S87). Here, timer processing is carried out in order to measure the slit holes 204c of the MF ring 204, based on output from the photo interrupter 225a. MF timer processing will be described later using FIG. 11.

Once MF timer processing has been carried out, next, rotation detection of the MF ring 204 is stopped (S89). A sensor for detection is turned off in step S85, and since a timer for rotation detection is finished in step S87, in this step a rotation detection operation for the MF ring 204 is stopped.

If the result of determination in step S54 is that there is no RF invalid instruction, it is determined whether or not the focus setting is AF (S55 in FIG. 10A). With this embodiment, focusing of the interchangeable lens 100 is carried out in AF mode, MF mode, or RF mode, as was described previously, and of these AF mode and MF mode are set by the photographer on menu screens that are displayed on the display monitor 105 of the camera body 100. In this step, it is determined whether or not AF mode has been set on the menu screen. Since there are cases where the photographer has not set a focusing mode, one of the modes is set as the default (with this embodiment, AF mode is set).

If the result of determination in step S55 is that AF mode has been set, next receipt of lens control commands is stopped (S57). Since RF mode was set in previously described step S51 and there was no RF invalid instruction in step S54, then the interchangeable lens 200 is set so as to not receive lens control commands, even if lens control commands are transmitted from the camera 100 to the interchangeable lens 200.

It is made possible for the camera body 100 to receive information such as a lens position acquisition signal from the interchangeable lens 200. By acquiring lens position information, at the time of control of the strobe unit 106 the body CPU 121 can carry out emission amount control etc. taking into consideration distance information corresponding to position of the focus adjustment lens 203.

If the result of determination S55 is that the focus setting (focus adjustment mode of the camera body) is not AF mode, the rotation detection sensor of the MF ring 204 is turned off (S59). The result of determination in step S55 is that MF mode has been set at the camera body 100 side, and the result of determination in step S54 is that an RF invalid instruction has not been output. However at the interchangeable lens 200 the MF ring 204 is at the RF position (second position) and RF mode has been set, and so it is not necessary to detect the rotation state even if the MF ring 204 has been subjected to a rotation operation. The sensor for rotation detection of the MF ring 204, namely the photo interrupter 225a (refer to FIG. 5), is therefor turned off.

Next, MF timer processing is carried out (S61). Here, timer processing is carried out in order to measure the slit holes 204c of the MF ring 204, based on output from the photo interrupter 225a. MF timer processing will be described later using FIG. 11.

Once MF timer processing has been carried out, next, rotation detection of the MF ring 204 is stopped (S63). A sensor for detection is turned off in step S59, and since a timer for rotation detection is finished in step S61, in this step a rotation detection operation for the MF ring 204 is stopped.

If receipt of lens control commands has been stopped in S57, or MF ring rotation detection stop has been carried out in step S63, readout of RF setting position is next carried out at time L1 (S65). Here, as was described using FIG. 6, the distance scale 24a for the index 25a is read by the encoder section 226a. At the time of this reading by the encoder section 226a, a lens communication synchronization signal is used as a timing signal for the detection timer.

The lens communication synchronization signal is in synchronization with a frame at the time of imaging by the image sensor 103, and is faster than the built-in timer of the lens CPU 221. As a result, even if a timer counter is not added, it is possible to use the lens communication signal as a high-speed counter at the time of reading the encoder section 226a. This read RF setting value can also be stored in flash ROM inside the interchangeable lens 200, and it is also possible, for example, to use as a preset value of drive position to the range index position to be executed by an operation on the camera body.

If the RF setting position has been read out, lens drive to the RF setting position is next carried out (S67). Here, the lens CPU 221 drives the focus adjustment lens 203 so as to focus at a distance corresponding to the RF setting position that was read out in step S65. In this step S67 also, by using the lens communication synchronization signal, it is possible to carry out drive control of the focus adjustment lens 203 at high speed, and it is possible to rapidly carry out focusing to a set position after the photographer has rotated the MF ring 204 to the RF setting position.

If the result of determination in step S51 is that the MF ring 204 is not at the RF position, the range index setting flag is cleared at time L1 (S71 in FIG. 10B). If the MF ring 204 is not positioned at the RF position (second position), release of RF mode is carried out, and the range index setting flag that that was set in step S53 is cleared.

Then, as in step S55, it is determined whether or not focus setting (focus adjustment mode of the camera body) is AF mode (S73). If the result of this determination is that AF mode has been set, receipt of lens control commands is commenced (S75). Since RF mode was set not in previously described step S51, then the lens CPU 221 of the interchangeable lens 200 is set so as to receive lens control commands, when lens control commands are transmitted from the camera 100 to the interchangeable lens 200.

On the other hand, if the result of determination in step S73 was that AF mode was not set, namely that MF mode was set, the rotation detection sensor of the MF ring 204 is next turned off (S77). When MF mode is executed as a focus adjustment mode, the MF position detection circuit 225 detects rotation states such as rotation direction, rotation amount and rotation velocity of the MF ring 204. The lens CPU 221 then drives the focus adjustment lens 203 in accordance with this detection result. In this step, the sensor for detecting rotation state of the MF ring 204, namely the photo interrupter 225*a* (refer to FIG. 5), is turned on.

Once the MF ring 204 rotation detection sensor has been turned on, next, MF timer processing is carried out (S79). Here, timer processing for rotation detection of the MF ring 204 is carried out. It should be noted that at this time, compared to RF setting, since the need to read out at high speed is low, the timer that is built into the lens CPU 221 is made a timer count. Detailed operation of this MF timer processing will be described later using FIG. 11.

Once MF timer processing has been carried out, next, rotation detection of the MF ring 204 is commenced (S81). Output of the photo interrupter 225*a* varies in accordance with movement of the slit holes 204*c* that rotate integrally with the MF ring 204. In this step, therefore, rotation state of the MF ring 204 is detected based on output of the photo interrupter 225*a*. Also, in step S81, the lens CPU 221 carries out drive control of the focus adjustment lens 203 based on this detected rotation state.

If MF ring rotation detection has commenced in step S81, or if reception of lens control signals has commenced in step S75, or if lens drive to the RF setting position has been carried out in step S67, or if MF ring rotation detection has been stopped in step S89, or if reception of lens control signals has commenced in step S83, MF ring operation detection and operation processing is completed and processing returns to the original processing flow.

Next, detailed operation of the MF timer processing in steps S61 and S79 will be described using the flowchart shown in FIG. 11. This MF timer processing executes timer processing for a timer counter to count clocks that are generated within the interchangeable lens 200, when detecting rotation state such as rotation direction and rotation speed of the MF ring 204.

Figure 11:
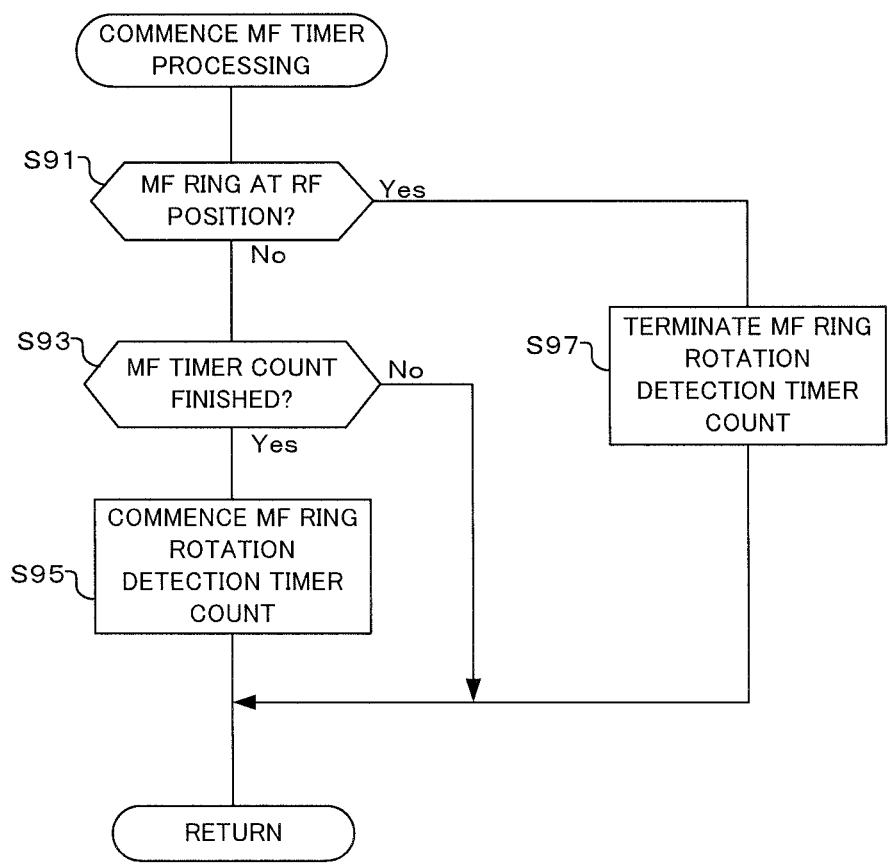
FIG. 11 is a flowchart showing MF timer processing in the modified example of operation of the camera body and the interchangeable lens of the first embodiment of the present invention.

If the flow for MF timer processing shown in FIG. 11 is entered, first, as with step S51, it is determined whether or not the MF ring 204 is at the RF position (S91). Here, it is detected whether or not it is the RF position (range focus position, second position) based on the result of position detection of the MF ring 204.

If the result of determination in step S91 is that the MF ring 204 is not at the RF position, it is determined whether or not counting of the MF timer counter has been completed (S93). MF timer count is commenced in subsequent step S95, and counting continues until counting is terminated in step S97. In this step it is determined whether or not the MF timer count has been terminated. If the result of this determination is that the MF timer count has been terminated, timer count for MF ring 204 rotation is commenced (S95). This MF timer count is a counter that uses a clock of the lens CPU, within the lens CPU 221.

If the result of determination in step S91 is that the MF ring 204 is at the RF position, MF ring 204 rotation detection timer count is terminated (S97). If the MF ring 204 is at the RF position and there is no RF invalid instruction, focusing of the focus adjustment lens 203 to a position corresponding to the absolute distance shown by the MF ring 204 is carried out by the encoder section 226*a* (refer to FIG. 6), and relative rotation amount of the MF ring 204 is not detected. The MF ring 204 rotation detection timer count is then terminated.

If the timer count of step S95 is commenced, or if the result of determination in step S93 is that the MF timer count has not been terminated, or if the timer count has been terminated in step S97, MF timer processing is terminated and the original processing flow is returned to.

As has been described above with the one embodiment of the present invention there are three focus adjustment modes, namely AF mode, MF mode and RF mode. Of these focus adjustment modes, one of either AF mode and MF mode may be set at the camera body 100 along with setting the MF ring 204 that is provided on the interchangeable lens 200 to the first position. On the other hand, RF mode is capable of being set by simply setting the MF ring 204 provided on the interchangeable lens 200 to the second position, regardless of the focusing mode setting at the camera body 100 side.

However, in a case where the MF ring 204 has been accidentally moved to the second position (RF position) against the wishes of the photographer, such as when the camera is in a bag etc., this often goes unnoticed. In this type of state it is not possible to carry out automatic focus adjustment at the camera body 100, even if AF mode is set. With this embodiment, if RF invalid is set beforehand in a menu mode or the like, it is possible to prevent this type of inconvenience.

Specifically, even if the MF ring 204 is at the RF position (S51 Yes), if RF invalid is set (present in S54) it is possible for the interchangeable lens 200 to carry out AF control by receiving lens control commands (S82, S83) as long as AF mode is set at the camera body 100 side.

Next, a second embodiment of the present invention will be described using FIG. 12. In the first embodiment, setting of RF invalid was carried out in the camera body 100, but with the second embodiment setting of RF invalid is carried out in the interchangeable lens 200.

Figure 6:
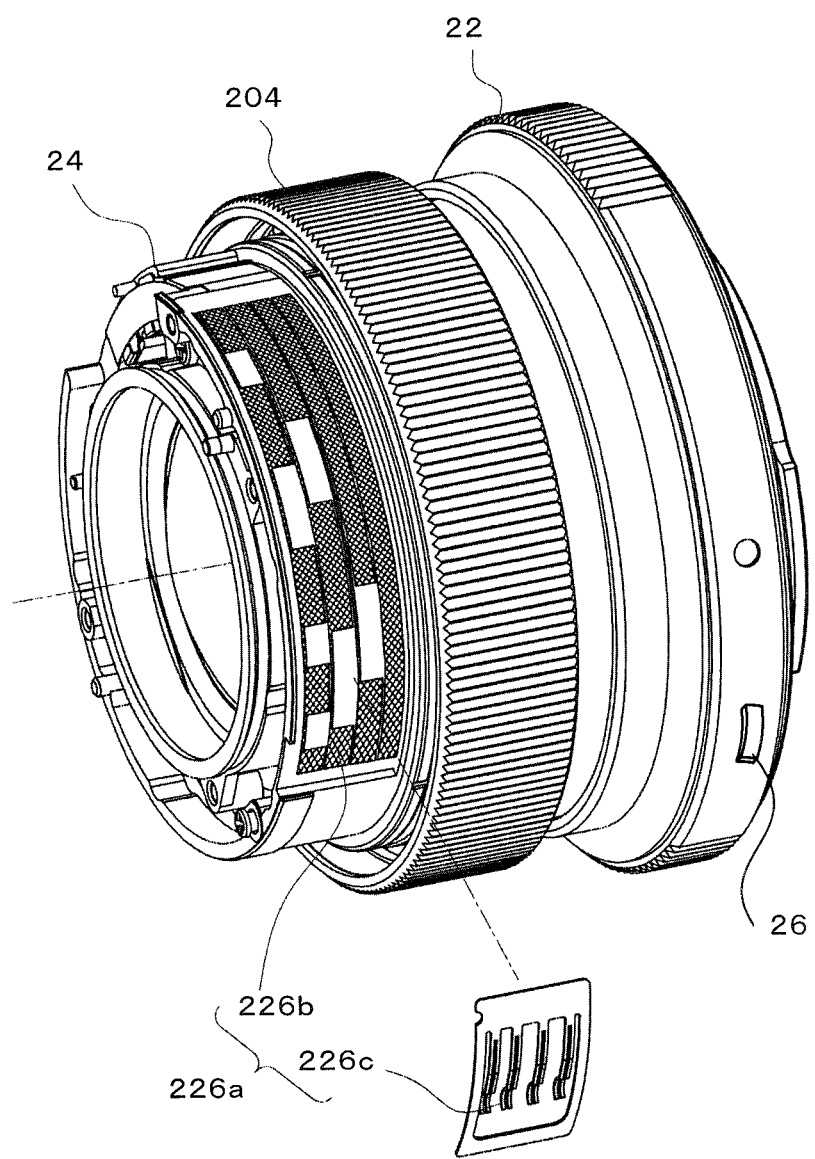
FIG. 6 is a perspective view showing the structure of an index position detection section of the camera of the first embodiment of the present invention.

The structure of this embodiment is the same as the structure of the first embodiment (refer to FIG. 1 to FIG. 7), and with this embodiment setting of RF invalid is carried out with a function button 26 of the interchangeable lens 200 (refer to FIG. 3, FIG. 4 and FIG. 6).

Operation of the second embodiment will be described using the flowchart shown in FIG. 12. Compared to the operation of the first embodiment shown in FIG. 8, operation of the camera body 100 of this embodiment differs in that steps S109 and S111 in FIG. 8 are omitted, but other steps are the same. Detailed description of steps that are the same is therefore omitted. With this embodiment, since setting of RF invalid is carried out in the interchangeable lens 200, steps S109 and S111 have been omitted from operation at the camera body side.

Operation of the interchangeable lens 200 differs from operation of the first embodiment shown in FIG. 8 in that steps S209-S211 in FIG. 8 are replaced with steps S215 and S217. Description will therefore concentrate on this point of difference.

If the result of determination in step S203 is at the RF position, it is determined whether or not the function button has been pressed down (S215). Here, the lens CPU 221 determines whether or not the function button 26 has been pressed down based on the state of the switch that is linked to the function button 26.

If the result of determination in step S215 is that the function button 26 has been pressed down, switching of AF mode and RF mode is carried out, together with entering of the respective standby state (S217). If the function button 26 is pressed down in a case where AF mode has been set, RF mode is switched to and an RF standby state is entered. Also, if the function button 26 is pressed down in a case where RF mode has been set, AF mode is switched to and an AF standby state is entered, that is, an RF invalid state is set. Accordingly, in the AF standby state an AF operation becomes possible regardless of the slide position of the MF ring 204. Also, if the function button 26 is pressed down in the AF standby state, the RF invalid state is released, RF mode is restored, and the RF standby state is entered (operation is in the order S217, S215, S217).

If the MF ring 204 is operated and slid to the MF position in the RF standby state, MF mode (S203, S204, S207) or AF mode (S203, S204, S205) is switched to in accordance with the focus adjustment mode at the camera body side. The mode that has been set is transmitted to the camera body 100 and the body CPU 121 may display the set mode on the display monitor 105 by means of the display circuit 128, and, if there is a display monitor on the interchangeable lens 200, may display the set mode on that display monitor. In this way, the focus adjustment mode is alternately switched every time the function button 26 is pressed down.

As a result, with the second embodiment of the present invention, it is possible to carry out an RF invalid instruction by operating a function button 26 that has been provided on the interchangeable lens 200 (refer, for example, to S215). In other words, a function restriction section that sets operation of the second control section (for example, RF mode control) to valid or invalid includes a switch member provided on the interchangeable lens, and the second control section is switched between valid and invalid every time operation of the switch member is detected.

As a result, with this embodiment it is possible to prevent the above type of drawback by issuing an RF invalid instruction using the function button 26, even if the MF ring 204 has been erroneously slid from the MF position to the RF position unknown to the photographer.

It should be noted that although with this embodiment instruction for RF invalid is carried out using the function button 26, it may also be carried out using another operating member.

Next, a modified example of operation of the second embodiment of the present invention will be described using the flowchart shown in FIG. 13. This modified example shows a more specific operation than the second embodiment, and in the flowcharts of FIG. 9A to FIG. 11 showing a modified example of first embodiment, this modified example is the same as the modified example of the first embodiment apart from the flowchart shown in FIG. 10A being replaced with the flowchart of FIG. 13.

Also, if the flowchart of FIG. 13 relating to this modified example is compared to the flowchart of FIG. 10A relating to the modified example of the first embodiment, it is the same as FIG. 10A apart from the fact that step S54 of FIG. 10A is replaced with step S54A in FIG. 13. Also, in the event that the result of determination in step S51 of FIG. 13 is No processing advances to step S71 shown in FIG. 10B, and if the result of determination in step S54 is Present processing advances to step S81 shown in FIG. 10B.

Description will therefore concentrate on points of difference. It should be noted that although in the second embodiment AF mode and RF mode were alternately switched every time the function button 26 was pressed down, with this modified example if the function button 26 is pressed, which becomes equivalent to the RF invalid instruction of the first embodiment being performed, and while the function button 26 continues to be pressed down, an RF invalid instruction state is entered.

If the range index setting flag is set at time L1 in step S53 of the flow shown in FIG. 13, it is determined whether or not the function button has been pressed down (S54A). Here, the lens CPU 221 performs determination based on the state of a switch that is linked to the function button 26.

If the result of determination in step S54A is that the function button 26 has been pressed down, then similarly to the case where the RF invalid instruction was performed in step S54 (refer to FIG. 8), processing is performed so that RF mode is not executed, in step S82 and onwards. Specifically, in the event that AF mode has been set at the camera body 100 side automatic focus adjustment is carried out using AF mode (refer to S82 Yes and S83 in FIG. 10B), while if MF mode has been set at the camera body 100 side manual focus using a rotation operation of the MF ring 204 is prohibited.

On the other hand, if the result of determination in step S54A is that the function button 26 has not been pressed down, then similarly to the modified example of the first embodiment control is executed based on RF mode in step S55 and onward.

As a result, with the modified example of the second embodiment of the present invention, it is possible to carry out an RF invalid instruction by operating a function button 26 that has been provided on the interchangeable lens 200 (refer, for example, to S54A). In other words, a function restriction section that sets operation of the second control section (for example, RF mode control) to valid or invalid switches the second control section between valid and invalid while it is detected that a switch member is pressed down. In a state where the photographer continues to press down the switch member, an invalid state for operation of the second control section continues, and the invalid state for operation of the second control section is released if pressing down of the switch member is stopped. Specifically, operation of the second control section becomes invalid as long as the photographer is pressing down the switch member.

This means that with this modified example also, it is possible to easily carry out an RF invalid instruction at the interchangeable lens 200 side, even in a case where the MF ring 204 has been slid and moved to the RF position against the photographer's wishes. Even if the MF ring 204 is at the RF position, there is no risk of erroneous operation against the wishes of the photographer.

As has been described above, in each of the embodiments and each of the modified examples of the present invention, when an operation section (for example, MF ring 204) is at a second position (RF position), operation of second control to forcibly carry out manual focus control is set to valid or invalid based on a detection result of absolute rotational position of the operating member, regardless of a focus mode instruction (for example, S209 and S211 in FIG. 8, S54-S82 in FIG. 10A, S215 and S217 in FIG. 12, and S54A-S82 in FIG. 13). As a result, there is no risk of erroneous operation even if the operating member is at the second position (RF position).

It should be noted that with each of the embodiments and each of the modified examples of the present invention, the camera body 100 and the interchangeable lens 200 are constructed separately, but this is not limiting and they may also be constructed integrally. Also, although RF invalid setting has been carried out on a menu screen, this is not limiting and the RF invalid setting may be carried out using other than a menu screen, such as by operation of an operating button or the like.

Also, with each of the embodiments and each of the modified examples of the present invention, both AF mode and MF mode are switched at the camera body 100, but the focusing modes at the camera body 100 side are not limited to 2 modes, and it is also possible to set other focusing modes, and it is also possible to only include AF mode. Also, with each of the embodiments and each of the modified examples of the present invention, the MF ring 204, as the ring member, has been moved between two positions, namely a first position and a second position, but this is not limiting and it is also possible to provide other positions, such as a third position.

Further, with each of the embodiments and each of the modified examples of the present invention, an apparatus for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC) tablet type computer, game console etc.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element', 'module,' 'device', 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A lens interchangeable type camera system, comprising an interchangeable lens and a camera body to which the interchangeable lens can be attached,
   the camera body comprising:
   a mode setting section that switches between auto focus and manual focus,
   the interchangeable lens comprising:
   an annular operation member, arranged outside the interchangeable lens, that is capable of sliding to a first position and a second position in the optical axis direction,
   a first detection section that detects position of the operation member,
   a second detection section that detects rotation direction and rotation amount of the operation member at a time when the operation member is at the first position as a result of a slide operation,
   a third detection section that detects rotation position of the operation member at a time when the operation member is at the second position as a result of a slide operation,
   a first control section that carries out manual focus control by detecting rotation direction and rotation amount of the operation member using the second detection section, in accordance with a manual focus mode command from the mode setting at a time when the operation member is at the first position, and
   a second control section that, when the operation member is at the second position, irrespective of a command from the mode setting section, notifies a detection result of the first detection section to the camera body, detects rotational position of the operation member using the third detection section, and forcibly carries out manual focus control based on the rotation position,
   wherein the lens interchangeable type camera system further comprises
   a function restriction section that sets operation of the second control section to valid or invalid.

2. The lens interchangeable type camera system of claim 1, wherein
   the function restriction section is provided in the camera body.

3. The lens interchangeable type camera system of claim 1, wherein
   the function restriction section is provided in the interchangeable lens.

4. The lens interchangeable type camera system of claim 1, wherein
   the function restriction section includes a switch member provided on the interchangeable lens, and the second control section is switched between valid and invalid every time operation of the switch member is detected, or the second control section is switched between valid and invalid while it is detected that the switch member is pressed down.

5. An interchangeable lens, that can be fitted to a camera body having a mode switching section that switches between autofocus and manual focus, comprising:
   an annular operation member, on the exterior of the interchangeable lens, that is capable of sliding to a first position or a second position in the optical axis direction,
   a first detection section that detects position of the operation member, a second detection section that detects rotation direction and rotation amount of the operation member at a time when the operation member is at the first position as a result of a slide operation, a third detection section that detects rotation position of the operation member at a time when the operation member is at the second position as a result of a slide operation, a first control section that carries out manual focus control by detecting rotation direction and rotation amount of the operation member using the second detection section, in accordance with a manual focus mode command from the mode setting at a time when the operation member is at the first position, a second control section that, when the operation member is at the second position, irrespective of a command from the mode setting section, notifies a detection result of the first detection section to the camera body, detects rotational position of the operation member using the third detection section, and forcibly carries out manual focus control based on the rotation position, and a function restriction section that sets operation of the second control section to valid or invalid.

6. The interchangeable lens of claim 5, wherein the function restriction section is provided in the camera body.

7. The interchangeable lens of claim 5, wherein the function restriction section includes a switch member provided on the interchangeable lens, and the second control section is switched between valid and invalid every time operation of the switch member is detected, or the second control section is switched between valid and invalid while it is detected that the switch member is pressed down.

8. A lens control method, for an interchangeable lens that can be attached to a camera body, the camera body being able to switch between autofocus and manual focus, the interchangeable lens comprising:

an annular operation member, arranged outside the interchangeable lens, that is capable of sliding to a first position and a second position in the optical axis direction, a first detection section that detects position of the operation member, a second detection section that detects rotation direction and rotation amount of the operation member at a time when the operation member is at the first position as a result of a slide operation, and a third detection section that detects rotation position of the operation member at a time when the operation member is at the second position as a result of a slide operation, the lens control method for the interchangeable lens comprising:

when the operation member is at the first position, carrying out first control to carry out manual focus control by detecting rotation direction and rotation amount of the operation member using the second detection section, in accordance with a mode command for the manual focus, when the operation member is at the second position, irrespective of a command from the mode setting section, notifying a detection result of the first detection section to the camera body, detecting rotational position of the operation member using the third detection section, and carrying out second control to forcibly carry out manual focus control based on the rotation position, and setting operation of the second control to valid or invalid.

9. The lens control method for an interchangeable lens of claim 8, wherein the interchangeable lens includes a switch member, and the second control is switched between valid and invalid every time operation of the switch member is detected, or the second control is switched between valid and invalid while it is detected that the switch member is pressed down.

* * * * *